US011433306B2

(12) United States Patent
Narita et al.

(10) Patent No.: US 11,433,306 B2
(45) Date of Patent: Sep. 6, 2022

(54) INFORMATION PROCESSING PROGRAM, SERVER, INFORMATION PROCESSING SYSTEM, AND INFORMATION PROCESSING DEVICE FOR CHANGING CHARACTER OBJECTS BETWEEN GAMES

(71) Applicant: CYGAMES, INC., Tokyo (JP)

(72) Inventors: Masahiro Narita, Tokyo (JP); Tomohiro Kawakami, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/154,270

(22) Filed: Jan. 21, 2021

(65) Prior Publication Data

US 2021/0138344 A1 May 13, 2021

Related U.S. Application Data

(63) Continuation of application No. PCT/JP2019/028804, filed on Jul. 23, 2019.

(30) Foreign Application Priority Data

Jul. 26, 2018 (JP) .............................. JP2018-140714

(51) Int. Cl.
*A63F 13/537* (2014.01)

(52) U.S. Cl.
CPC .................. *A63F 13/537* (2014.09)

(58) Field of Classification Search
CPC ....... A63F 13/86; A63F 13/798; A63F 13/537
See application file for complete search history.

(56) References Cited

U.S. PATENT DOCUMENTS

| 8,353,767 B1 | 1/2013 | Borst et al. |
| 2003/0153374 A1* | 8/2003 | Gilmore .............. G07F 17/3276 463/6 |
| 2005/0049045 A1* | 3/2005 | Abe ........................ A63F 13/80 463/31 |

(Continued)

FOREIGN PATENT DOCUMENTS

| JP | H10-198821 A | 7/1998 |
| JP | 2018-77738 A | 5/2018 |
| JP | 2018-94247 A | 6/2018 |

OTHER PUBLICATIONS

International Search Report issued in Application No. PCT/JP2019/028804, dated Oct. 15, 2019 (5 pages).

(Continued)

*Primary Examiner* — Steve Rowland
(74) *Attorney, Agent, or Firm* — Osha Bergman Watanabe & Burton LLP

(57) ABSTRACT

An information processing program realizes, on a computer: a first-game control function that runs a first game while allowing a group of characters to participate therein; a subset creating function that creates, on the basis of a game result of the first game, a subset consisting of some characters included in the group of characters from a universal set consisting of all the characters included in the group of characters; and a second-game control function that runs a second game while performing control for the characters included in the subset created by the subset creating function so as to display, on a display medium, at least some character objects in the form of character objects of a predetermined kind.

12 Claims, 12 Drawing Sheets

(56) References Cited

U.S. PATENT DOCUMENTS

| | | | | |
|---|---|---|---|---|
| 2006/0030407 | A1* | 2/2006 | Thayer | G07F 17/32 463/42 |
| 2007/0111789 | A1* | 5/2007 | van Deursen | A63F 13/12 463/40 |
| 2007/0202937 | A1* | 8/2007 | Peires | A63F 1/00 463/9 |
| 2008/0300045 | A1* | 12/2008 | Ratcliff | G07F 17/3276 463/25 |
| 2009/0082112 | A1* | 3/2009 | Itskov | A63F 13/803 463/42 |
| 2012/0172123 | A1* | 7/2012 | Beaulieu | G07F 17/3276 463/31 |
| 2015/0273320 | A1* | 10/2015 | Pieron | A63F 13/69 463/25 |
| 2015/0356831 | A1* | 12/2015 | Osibodu | G07F 17/3272 463/25 |
| 2017/0124804 | A1* | 5/2017 | Nelson | A63F 13/46 |

OTHER PUBLICATIONS

Written Opinion issued in International Application No. PCT/JP2019/028804, dated Oct. 15, 2019 (5 pages).

"Horse Girl (Uma Musume) Pretty Derby Abema Stakes, 2nd Round, Reviewing the new information special on animations & games!!!;" Sep. 4, 2018; Retrieved from the Internet: URL: https://??????.com/%E3%82%A6%E3%83%9E%E5%A8%98%E3%83%97%E3%83%AA%E3%83%86%E3%82%A3%E3%83%BC%E3%83%80%E3%83%BC%E3%83%93%E3%83%BCabema%E3%82%B9%E3%83%86%E3%83%BC%E3%82%AF%E3%82%B9%E7%AC%AC2r%E3%80%80%E3%82%A2%E3%83%8B (13 pages).

"Idle Master SP" is a game like this! Introduction to a Producer's Busy Day; Dengeki Online; Sep. 4, 2018; Retrieved from the Internet: URL: http://dengekionline.com/elem/000/000/098/98540/ (8 pages).

"Connect, reach out, and compete with other Players! What is the office mode of "Idle Master SP"?;" Dengeki Online; Sep. 4, 2018; Retrieved from the Internet: URL: http://dengekionline.com/elem/000/000/116/116659/ (8 pages).

"Train them up for racing and dancing!? Contents of Cygames' new game "Horse Girl (Uma Musume)" are revealed!;" Mar. 27, 2017; Retrieved from the Internet: URL: https://app.famitsu.com/20170327_1001555/ (9 pages).

Notice of Reasons for Refusal issued in Japanese Application No. 2018-140714, dated Sep. 18, 2018 (4 pages).

Notice of Reasons for Refusal issued in Japanese Application No. 2018-140714, dated Feb. 12, 2019 (5 pages).

Notification of Reasons for Refusal issued in the JP Patent Application No. 2019-073426, mailed on Nov. 2, 2021 5 pages).

"Horse Girl (Uma Musume) Pretty Derby" "Weekly Famitsu magazine 2018 4/19" ,Gz Brain, Apr. 5, 2018, vol. 33, No. 16, pp. 22-27 (9 pages).

"Horse Girl (Uma Musume) Pretty Derby", "Comptiq 2017 05," Kadokawa Corporation, Apr. 10, 2017, vol. 35, No. 5, pp. 130 to 133 (7 pages).

AppMedia Editing Portion, Method of Acquiring Clothing, Method of Change, [online], Jul. 3, 2017, AppMedia Co., Ltd., AppMedia, [search on Oct. 15, 2021], Internet <URL:https://appmedia.jp/theaterdays/867335 <https://protect-us.mimecast.com/s/t61dCzp9YZulgk7t46VKN?domain=appmedia.jp> >.

Notice of Reasons for Refusal issued in Japanese Application No. 2019-073426, dated Feb. 15, 2022 (5 pages).

* cited by examiner

INFORMATION PROCESSING PROGRAM, SERVER, INFORMATION PROCESSING SYSTEM, AND INFORMATION PROCESSING DEVICE FOR CHANGING CHARACTER OBJECTS BETWEEN GAMES

TECHNICAL FIELD

The present invention relates to information processing programs, servers, information processing systems, and information processing devices.

BACKGROUND ART

Among games that are provided on electronic appliances such as smartphones and computer game machines, there is a type of game in which a player can change character objects constituting a character in the game.

As an example, Patent Literature 1 discloses a technology for realizing a game in which it is possible to change character objects on the basis of player operations. With the technology disclosed in Patent Literature 1, it is possible to change the appearance of a character (e.g., the basic figure, hairstyle, and makeup of the character) as well as character objects such as items worn by the character (e.g., a costume, ornaments, and possessions) on the basis of player operations.

CITATION LIST

Patent Literature

Japanese Unexamined Patent Application, Publication No. 2018-094247

DISCLOSURE OF THE INVENTION

Problems to be Solved by the Invention

A player can have more fun in the course of a game by changing character objects by means of a general technology such as the technology disclosed in Patent Literature 1. However, changing character objects is directed to just having fun in the course of a game, and is not directed to improving the motivation of a player concerning the result of the game (e.g., winning or losing in the game).

The present invention has been made in view of the situation described above, and it is an object thereof to improve the motivation of a player concerning the result of a game in relation to a character object.

Means for Solving the Problems

In order to achieve the above object, an information processing program according to an aspect of the present invention realizes, on a computer:
a first-game control function that runs a first game while allowing a group of characters to participate therein; a subset creating function that creates, on the basis of a game result of the first game, a subset consisting of some characters included in the group of characters from a universal set consisting of all the characters included in the group of characters; and
a second-game control function that runs a second game while performing control for the characters included in the subset created by the subset creating function so as to display, on a display medium, at least some character objects in the form of character objects of a predetermined kind.

Effects of the Invention

The present invention makes it possible to improve the motivation of a player concerning the result of a game in relation to a character object.

PREFERRED MODE FOR CARRYING OUT THE INVENTION

An embodiment of the present invention will be described below with reference to the drawings.

In this embodiment, a player is allowed to select a character and to play a plurality of games (hereinafter referred to as a "first game" and a "second game") via the selected character. In this case, in this embodiment, a character object to be used for character display in the second game is determined on the basis of a game result of the first game.

For example, in the case where the game result is good, such as finishing in a high place in the first game or defeating an opponent in the first game, a character object desired by the player is used as the character object to be used for character display in the second game. That is, in order to play the second game via the desired character object and to have more fun in the second game, the player needs ideas and preparations for improving the game result of the first game.

That is, with this embodiment, it becomes possible to improve the motivation of the player concerning the result of the game in relation to the character object. Furthermore, with this embodiment, it is possible to enhance the fun of both the first game and the second game for the player.

[Overall Configuration of the System]

Figure 1:
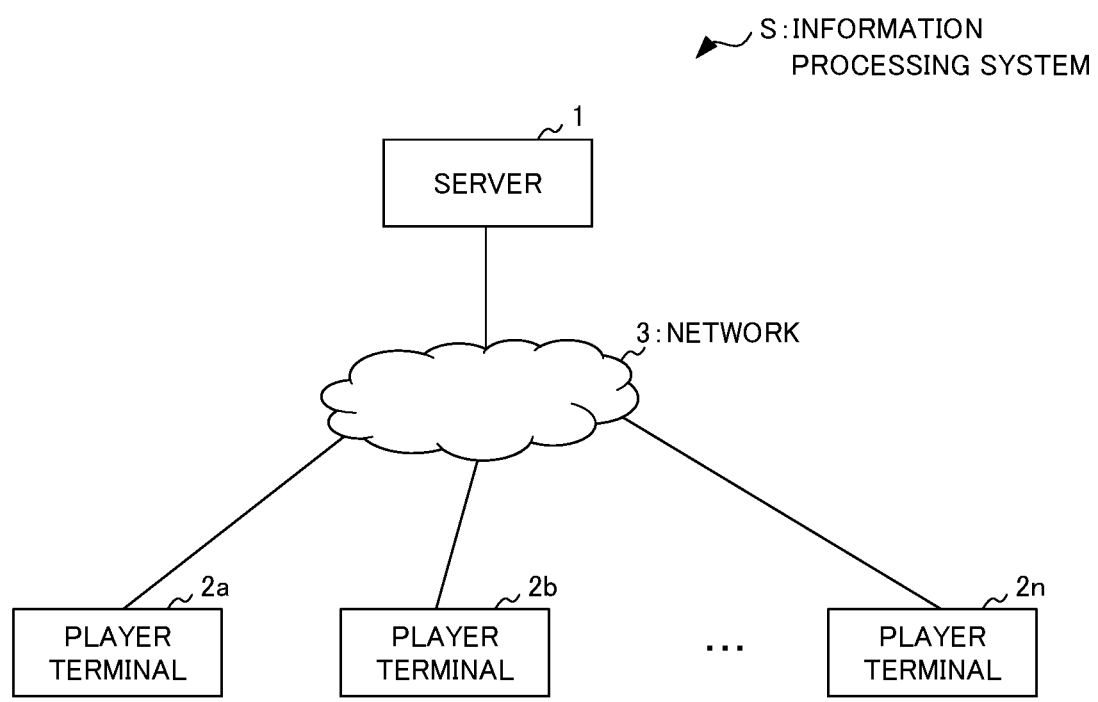
FIG. 1 is a block diagram showing the overall configuration of an information processing system according to an embodiment of the present invention.

The overall configuration according to this embodiment will be described with reference to FIG. 1. FIG. 1 is a block diagram showing the overall configuration of an information processing system S according to this embodiment.

As shown in FIG. 1, the information processing system S is configured to include a server 1, n (n is an arbitrary integer greater than or equal to one) player terminals 2, and a network 5.

The information processing system S is what is called a client-server system. The information processing system S is realized by mutually carrying out communication between the n player terminals 2 acting as clients and the server 1 via the network 5.

The server 1 is realized, for example, by a server device. Furthermore, the player terminals 2 are realized, for example, by smartphones, game machines, or personal computers. Furthermore, the network 5 is realized, for example, by a network such as a LAN (Local Area Network), the Internet, or a mobile phone network, or a network formed by combining these types of network.

In the drawings, a player terminal 2a, a player terminal 2b, and a player terminal 2n are shown as the n player terminals 2. In the following description, however, these n player terminals 2 will be simply referred to as the "player terminals 2", with the reference signs partially omitted, in the case where no distinction is made thereamong.

[Hardware Configurations]

Figure 2:
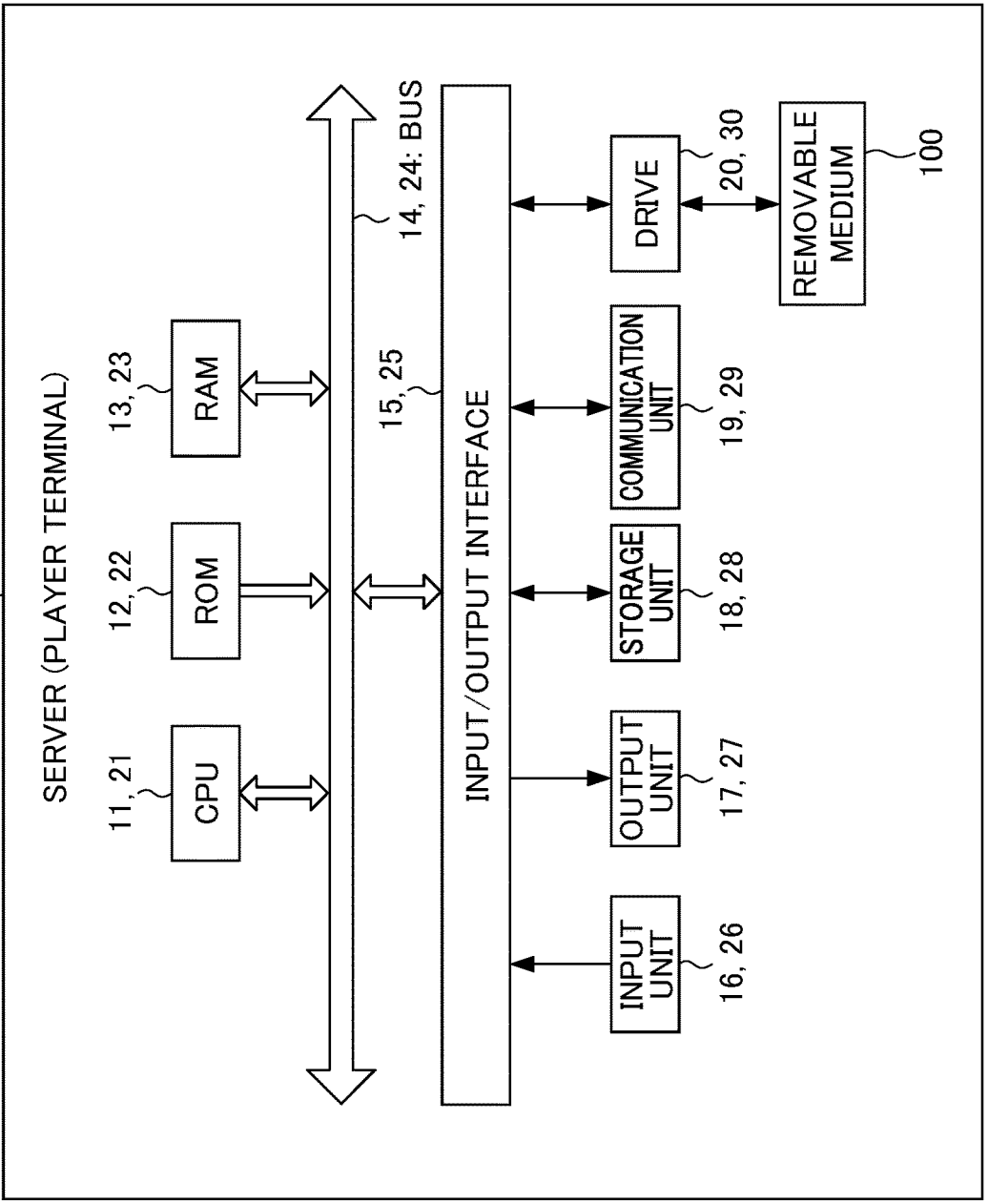
FIG. 2 is a block diagram showing the hardware configurations of a server and a player terminal according to the embodiment of the present invention.

Next, the hardware configurations according to this embodiment will be described with reference to FIG. 2. FIG. 2 is a block diagram showing the hardware configuration of the server 1 and the hardware configuration of the player terminal 2 according to the embodiment of the present invention. In the figure, reference signs corresponding to the hardware of the server 1 are shown without adding parentheses, and reference signs corresponding to the hardware of the player terminal 2 are shown with added parentheses.

First, the hardware configuration of the server 1 will be described. As shown in FIG. 2, the server 1 includes a CPU (Central Processing Unit) 11, a ROM (Read Only Memory) 12, a RAM (Random Access Memory) 13, a bus 14, an input/output interface 15, an input unit 16, an output unit 17, a storage unit 18, a communication unit 19, and a drive 20.

The CPU 11 executes various kinds of processing according to programs recorded in the ROM 12 or programs loaded from the storage unit 18 into the RAM 13.

The RAM 13 stores, as appropriate, data, etc. needed for the execution of various kinds of processing by the CPU 11.

The CPU 11, the ROM 12, and the RAM 13 are connected to each other via the bus 14. The input/output interface 15 is also connected to the bus 14. The input unit 16, the output unit 17, the storage unit 18, the communication unit 19, and the drive 20 are connected to the input/output interface 15.

The input unit 16 is formed of various kinds of buttons, a touchscreen, a microphone, or the like, and accepts input of various kinds of information in accordance with instruction operations performed by the administrator of the server 1 or the like. Alternatively, the input unit 16 may be realized by an input device, such as a keyboard or a mouse, that is independent of a main unit accommodating the other units of the server 1.

The output unit 17 outputs image data or music data to a display, a speaker, or the like. The image data or music data output from the output unit 17 is output from the display, the speaker, or the like as an image or music recognizable by the player.

The storage unit 18 is formed of a semiconductor memory, such as a DRAM (Dynamic Random Access Memory), and stores various kinds of data.

The communication unit 19 realizes communication that is carried out with other devices. For example, the communication unit 19 carries out communication mutually with the player terminals 2 via the network 5.

The drive 20 is provided as needed and as appropriate. A removable medium 100 formed of a magnetic disk, an optical disk, a magneto-optical disk, a semiconductor memory, or the like is loaded, as appropriate, on the drive 20. The removable medium 100 stores programs for executing games and various kinds of data, such as image data. The programs and the various kinds of data, such as image data, read by the drive 20 from the removable medium 100, are installed in the storage unit 18, as needed.

Next, the hardware configuration of the player terminal 2 will be described. As shown in FIG. 2, the player terminal 2 includes a CPU 21, a ROM 22, a RAM 23, a bus 24, an input/output interface 25, an input unit 26, an output unit 27, a storage unit 28, a communication unit 29, and a drive 30. These units individually have functions equivalent to those of the units having the same names and different reference signs in the server 1 described above. Thus, repeated descriptions will be omitted.

Note that, in the case where the player terminal 2 is configured as a portable terminal, the hardware units of the player terminal 2, as well as a display and a speaker, may be realized in the form of an integrated device.

[Functional Configurations]

Next, the functional configuration of the server 1 and the functional configuration of the player terminal 2 will be described with reference to FIG. 3.

Figure 3:
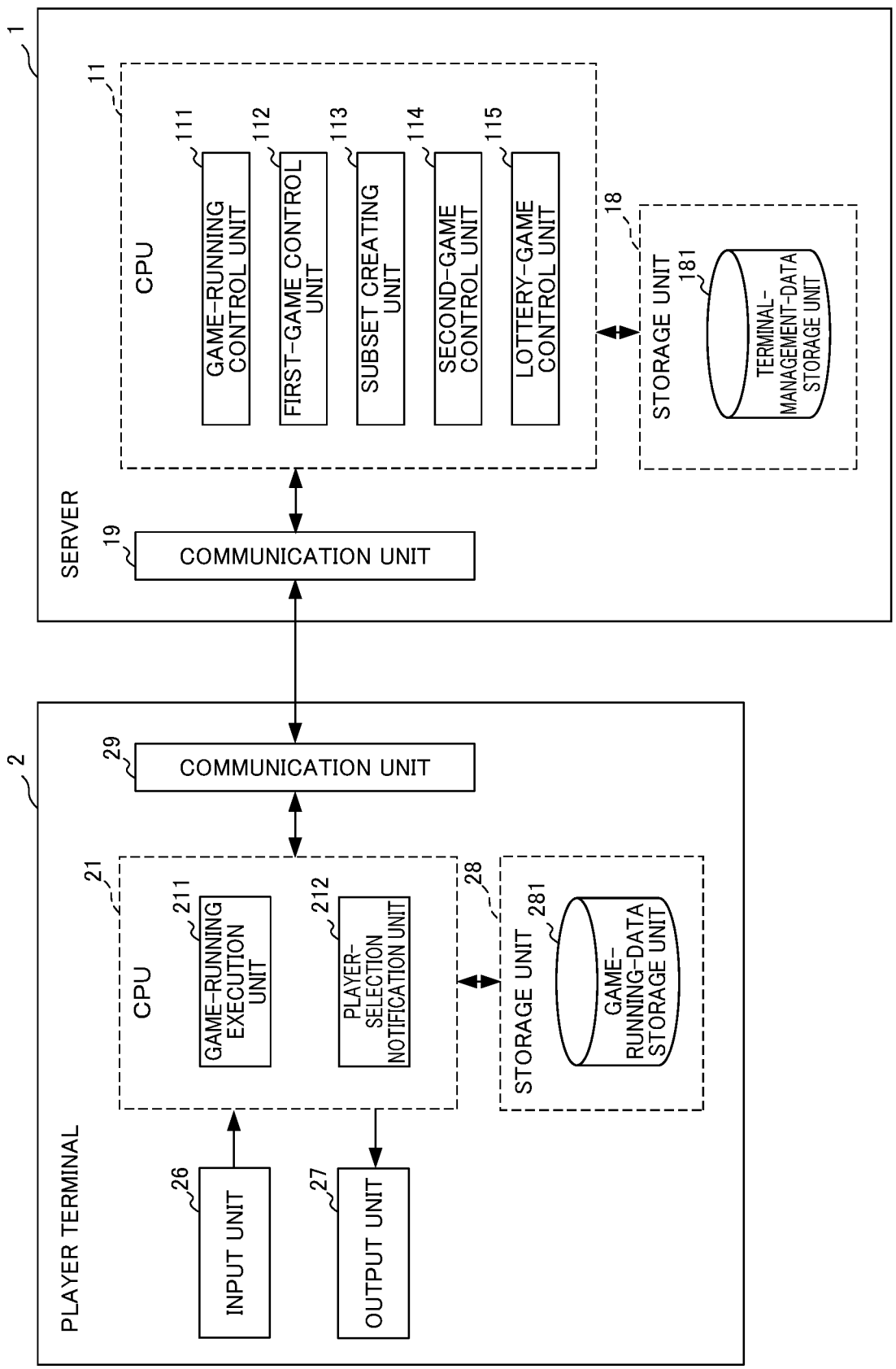
FIG. 3 is a functional block diagram showing, of the functional configurations of the server and the player terminal in FIG. 2, functional configurations for executing a multiple-game linkage process and a lottery game process.

FIG. 3 is a block diagram showing, of the functional configuration of the server 1 and the functional configuration of the player terminal 2 shown in FIGS. 1 and 2, functional configurations for executing processes such as a multiple-game linkage process and a lottery game process.

Here, the multiple-game linkage process refers to a series of processing steps for executing the first game and executing the second game while performing display by using a character object determined on the basis of a game result of the first game.

Furthermore, the lottery game process refers to a series of processing steps for performing a lottery with which an in-game currency is consumed and granting the player the right to select a specific kind of character object on the basis of the lottery result.

First, the functional configuration of the player terminal 2 will be described.

In the case where the multiple-game linkage process and the lottery game process are executed, the CPU 21 functions as a game-running execution unit 211 and a player-selection notification unit 212, as shown in FIG. 3.

Furthermore, a game-running-data storage unit 281 is set in an area of the storage unit 28.

The game-running execution unit 211 executes processing for running games. The game-running execution unit 211 runs the games on the basis of game software included in the game-running-data storage unit 281, which will be described later, the contents of player operations concerning the games, input from the input unit 26, and control instructions from a game-running control unit 111, which will be described later.

Furthermore, as the games are run, the game-running execution unit 211 executes control processing for generating game images from image data included in the game-running-data storage unit 281, which will be described later, and displaying the generated images on the display connected to the output unit 17. Similarly, as the games are run, the game-running execution unit 211 executes control processing for generating game music and audio from music data and audio data included in the game-running-data storage unit 281, which will be described later, and outputting the generated music and audio from the speaker connected to the output unit 17.

Here, in this embodiment, predetermined parameters in the games run by the game-running execution unit 211 are managed by the server 1. For example, parameters corresponding to information indicating which character is owned by the player, the status of the character, character objects that can be selected by the player, past game results, the amount of an in-game currency owned in the games, etc. are managed by the server 1.

Thus, in the case where processing involving changes in these predetermined parameters (e.g., processing involving increases or decreases in the values of the parameters or processing involving changes in flags indicating the statuses of the parameters) occurs in the games, the game-running execution unit 211 carries out communication with the server 1 to update the parameters managed by the server 1. Then, the game-running execution unit 211 receives the updated parameters from the server 1 and continues to run the games in accordance with the updated parameters.

For example, the multiple-game linkage process and the lottery game process, described above, are processes involving changes in the predetermined parameters. Thus, in the case where one of these processes occurs, the game-running execution unit 211 carries out communications with the server 1 to update the parameters.

As the games run by the game-running execution unit 211, it suffices for the first game to be a game with which a certain game result is produced, and it suffices for the second game to be a game involving display using a character object. That is, this embodiment is applicable to arbitrary games, without any limitation as to the game content, the game genre, etc.

In this embodiment, as an example, the first game is a game in which a plurality of characters are compared to racehorses and in which the plurality of characters compete with each other for places. Furthermore, in this embodiment, as an example, the second game is a game in which the characters that participated in the first game give performances in accordance with pieces of music.

Here, character objects (e.g., character costumes) in the second game are determined on the basis of the places in the first game. For example, character objects selected by the players are used for characters within the top three places in the first game. Meanwhile, for the other characters, general character objects corresponding to game media that determine the content of the second game (e.g., pieces of music or stage objects, selected scenarios, etc. used in the second game) are used.

Note that the first game and the second game may be configured to proceed automatically without requiring player operations in the games. In this case, playing the first game and the second game includes just watching these games proceeding automatically without the player having to perform operations.

The details of the first game and the second game will be described later with reference to FIGS. 4 to 12.

The player-selection notification unit 212 notifies the server 1 of the contents of selections by the player. For example, the player-selection notification unit 212 accepts the selection of a character that participates in the first game and the second game, the selection of a character object to be used in the case where the character is displayed, and the selection of a piece of music to be used in the second game, on the basis of player operations input from the input unit 26. Then, the player-selection notification unit 212 sends the contents of the accepted player selections to the server 1 to notify the server 1 of the contents of the player selections.

The communication by the game-running execution unit 211 and the player-selection notification unit 212 with the server 1 is carried out by using the communication unit 29. Although the network 5 for realizing communication is present between the player terminal 2 and the server 1, as described earlier with reference to FIG. 1, the network 5 is not shown in FIG. 3.

The game-running-data storage unit 281 stores various kinds of data needed by the game-running execution unit 211 for running the games. Examples of the various kinds of data for running the games include game software constituted of programs for executing the game, as well as image data, music data, and audio data for generating game images and sounds. Furthermore, in this embodiment, at least some characters and backgrounds in the first game and the second game are displayed by using three-dimensional computer graphics. Thus, the game-running-data storage unit 281 also stores polygon data, texture data, etc. for realizing the display based on three-dimensional computer graphics.

Although the various kinds of data for running the games may be stored only in the game-running-data storage unit 281 of the storage unit 28, the various kinds of data may be read by the drive 20 from the removable medium 100, as appropriate. Alternatively, the various kinds of data may be transmitted to the player terminal 2, as appropriate, from the server 1 or from another device, which is not shown, such as a server, by way of communication via the communication unit 29. That is, the various kinds of data may be downloaded as needed and as appropriate.

Next, the functional configuration of the server 1 will be described.

In the case where the multiple-game linkage process and the lottery game process are executed, the CPU 11 functions as a game-running control unit 111, a first-game control unit 112, a subset creating unit 113, a second-game control unit 114, and a lottery-game control unit 115, as shown in FIG. 3. Furthermore, a terminal-management-data storage unit 181 is set in an area of the storage unit 18.

The game-running control unit 111 controls the execution of processing for running games, performed by the game-running execution unit 211. The game-running control unit 111 outputs the contents of player selections, included in a notification from the player-selection notification unit 212, to the first-game control unit 112 or the second-game control unit 114, which will be described later. Furthermore, the game-running control unit 111 obtains the result of processing concerning the first game or the second game, performed on the basis of the contents of the player selections by the first-game control unit 112, the second-game control unit 114, etc., which will be described later. Then, the game-running control unit 111 sends control instructions based on the obtained processing result to the game-running execution unit 211 via the communication unit 29.

For example, in relation to the first game, the control instruction includes the places of individual characters and variations in the stamina values thereof in the course of the first game, as well as the final places of the individual characters (i.e., the game results of the first game). Furthermore, in relation to the second game, for example, the control instruction includes the positions and roles of the individual characters, the kinds of character objects used to display the individual characters, and the kinds of pieces of music used. The game-running execution unit 211 generates images, etc. simulating the content of the first game and the second game on the basis of such control instructions and outputs the generated images, etc. from the output unit 27.

The above-described cooperation between the player terminal 2 and the server 1 makes it possible to play the first game and the second game on the basis of his or her own selections.

The first-game control unit 112 performs processing concerning the first game. For example, the first-game control unit 112 determines a character that participates in the first game and a character object to be used for displaying the character on the basis of the contents of player selections, obtained from the game-running control unit 111. Note that the characters that compete with the character selected by the player in the first game may be characters selected by other players or NPCs (Non Player Characters) managed by the server 1.

Furthermore, the first-game control unit 112 performs processing concerning the first game on the basis of the parameters, etc. of the individual characters included in the group of characters participating in the first game, as well as rules in the first game. Then, the first-game control unit 112 outputs the places of the individual characters and variations in the stamina values thereof in the course of the first game, as well as the final places of the individual characters (i.e., the game results of the first game), which constitute the processing result, to the game-running control unit 111. Furthermore, the first-game control unit 112 also outputs the processing result to the subset creating unit 113.

The subset creating unit 113, on the basis of the game results of the first game, creates a subset consisting of some characters included in the group of characters participating in the first game from the universal set of all the characters included in the group of characters. In this embodiment, as an example, the subset creating unit 113 creates a subset consisting of characters not included in the top three places in the first game. That is, the subset creating unit 113 creates a subset consisting of characters at the fourth and lower places from the top in the first game. The subset creating unit 113 outputs the subset created to the second-game control unit 114.

The second-game control unit 114 performs processing concerning the second game. For example, the second-game control unit 114 determines a character that participates in the second game, a character object to be used for displaying the character, and a piece of music to be used in the second game, on the basis of the contents of player selections, obtained from the game-running control unit 111.

Furthermore, the second-game control unit 114 determines the positions, roles, etc. of characters in the second game on the basis of the game results of the first game. For example, characters that finished in high places in the first game are disposed at conspicuous positions on the screen and play the roles of giving various performances. Furthermore, the second-game control unit 114 determines that characters included in the subset obtained from the subset creating unit 113 are to be displayed by using general character objects and that characters not included in the subset are to be displayed by using character objects selected by the players.

Then, the second-game control unit 114 outputs the characters that participate in the second game, the character objects to be used for displaying the characters, the pieces of music to be used in the second game, and the positions, roles, etc. of the characters in the second game to the game-running control unit 111. In this embodiment, since processing concerning the first game and the second game is collectively performed at the server, it is possible to reduce processing at the player terminal 2. Furthermore, it is possible to prevent tampering, etc. in processing concerning the first game and the second game at the player terminal 2.

The group of characters that participate in the second game is the same as the group of characters that participate in the first game. Note, however, that in this embodiment, in the case where the character selected by the player is included in the subset (i.e., finished in the fourth and lower places from the top in the first game), the second game is not displayed on the player terminal 2. That is, in this embodiment, in the case where the character selected by the player failed to finish within the top three places, the player is not allowed to play and watch the second game. Thus, according to this embodiment, playing and watching the second game in itself becomes a purpose for the player, which serves to further improve the motivation concerning the game result of the first game.

The lottery-game control unit 115 performs processing concerning a lottery game. Specifically, the lottery-game control unit 115 determines an amount of in-game currency that is consumed in a lottery on the basis of the content of a player selection, obtained from the game-running control unit 111. Then, the lottery-game control unit 115 performs a lottery while consuming the in-game currency by the determined amount of consumption. This lottery is performed on the basis of predetermined rules. For example, the lottery is performed on the basis of the result of computational processing based on a predetermined function.

Then, on the basis of the result of the lottery, the lottery-game control unit 115 grants the player the right to select a specific kind of character object. For example, the lottery-game control unit 115 grants the player the right to select a specific character object (e.g., a costume) at random on the basis of the result of the lottery. Thus, in the case where the player does not have (i.e., has not acquired) the right to select the character object, it newly becomes possible for the player to select the character object in the first game or the second game.

Meanwhile, in the case where the player has (i.e., has already acquired) the right to select the character object, the player may be granted the right to select another character object or the player may not be granted the right to select a character object in the current lottery game.

Furthermore, depending on the result of the lottery, the lottery-game control unit 115 may not grant the player the right to select a character object in the current lottery game. That is, what is called a blank may be included in the lottery game.

Furthermore, the lottery game performed by the lottery-game control unit 115 may be a lottery game for prizes other than character objects. For example, on the basis of the result of the lottery game performed by the lottery-game control unit 115, the player may be granted the right to select a specific kind of piece of music or the right to select a specific kind of character.

Note that the amount of the in-game currency can be increased, for example, by the player paying a price. In this case, the payment of the price by the player is realized by way of cash settlement using a credit card or settlement using electronic money. In addition, it may be allowed to increase the amount of the in-game currency by other methods. For example, it may be allowed to increase the amount of the in-game currency in response to triggers such as communication between players in the games or the accomplishment of a predetermined event in the first game or the second game.

The terminal-management-data storage unit 181 stores management data concerning the player terminal 2. The management data concerning the player terminal 2 refers to predetermined parameters in the games run by the game-running execution unit 211, as described earlier in the description of the game-running execution unit 211. Examples of the management data that is stored include parameters corresponding to information indicating which character is owned by the player, the status of the character, character objects that can be selected by the player, past game results, the owned amount of the in-game currency in the games, etc. In the case where a plurality of player terminals 2 are connected to the server 1, the management data is managed individually for each player terminal 2 or for each player on the basis of identification information of the player terminal 2, identification information of the player, or the like.

[Operations]

Figure 4:
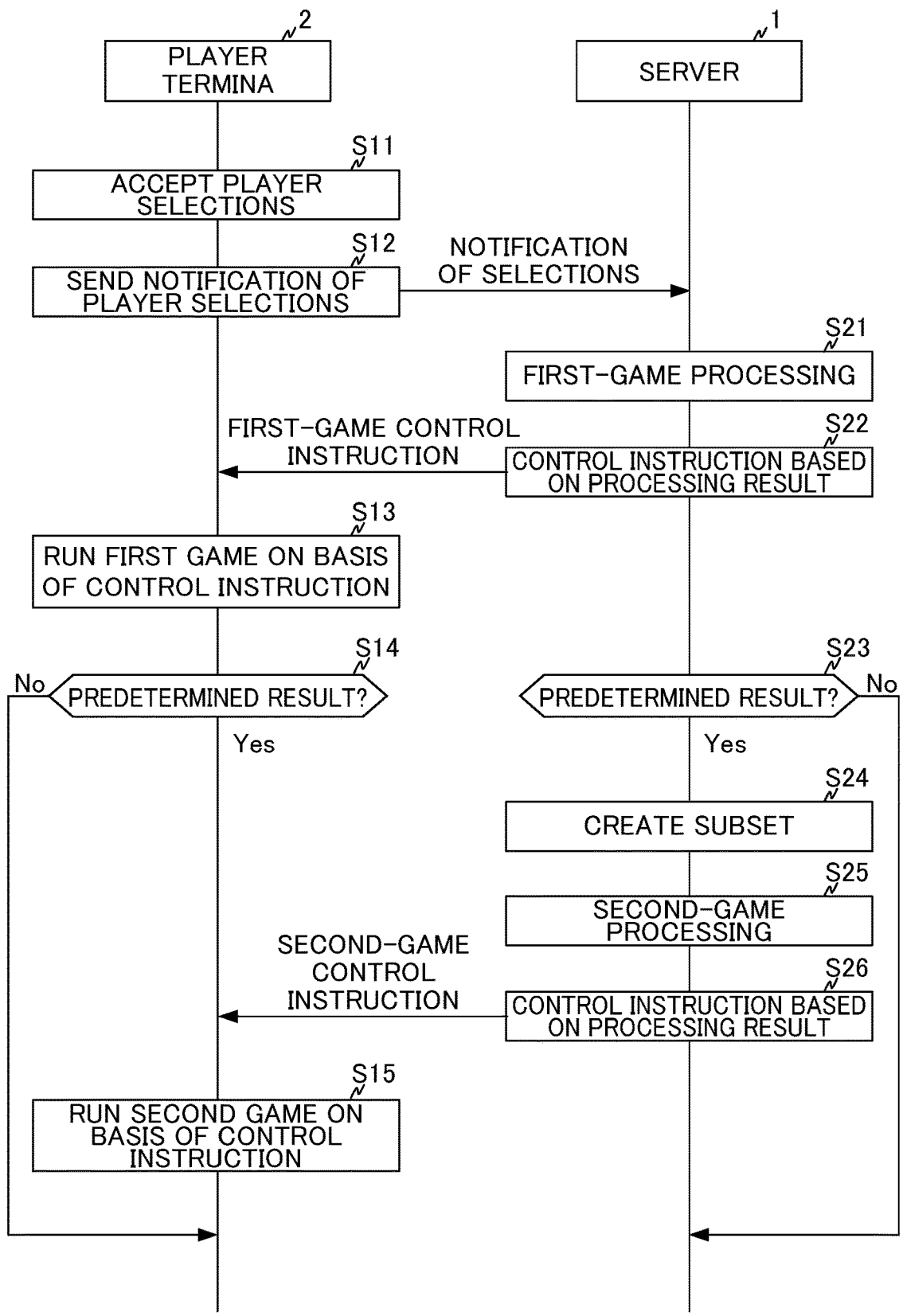
FIG. 4 is a sequence diagram for explaining the flow of the multiple-game linkage process executed by the server and the player terminal in FIG. 2 having the functional configurations in FIG. 3.

The functional blocks of the player terminal 2 and the server 1 have been described above. Next, the operations in the multiple-game linkage process and the lottery game process executed by the player terminal 2 and the server 1 will be described with reference to FIGS. 4 to 13. Here, FIG. 4 is a sequence diagram for explaining the flow of the multiple-game linkage process. Furthermore, FIGS. 5 to 12 are schematic illustrations showing display examples in the first game and the second game run in the multiple-game linkage process. Furthermore, FIG. 13 is a sequence diagram for explaining the flow of the lottery game process.

[Multiple-Game Linkage Process]

First, the multiple-game linkage process will be described with reference to FIG. 4. The multiple-game linkage process is executed, for example, when the player has performed an operation for requesting the execution of the first game.

In step S11, the player-selection notification unit 212 accepts player selections. Furthermore, in step S12, the player-selection notification unit 212 sends the contents of the player selections accepted to the server 1 to notify the server 1 of the contents of the player selections.

In step S21, the first-game control unit 112 performs processing concerning the first game on the basis of the player selections included in the notification received in step S12. Then, the first-game control unit 112 outputs the processing result to the game-running control unit 111.

In step S22, the game-running control unit 111 sends a control instruction concerning how the first game is to be run to the player terminal 2 on the basis of the processing result in step S21.

In step S13, the game-running execution unit 211 runs the first game on the basis of the control instruction for the first game, sent in step S22.

In step S14, the game-running execution unit 211 determines whether or not the game result of the first game, included in the control instruction for the first game, sent in step S22, was a predetermined result.

Here, in this embodiment, it is determined that the game result of the first game was the predetermined result in the case where the character selected by the player finished within the top three places. That is, in the case where the character selected by the player finished within the top three places, step S14 results in Yes, and the process proceeds to step S15. Meanwhile, in the case where the character selected by the player failed to finish within the top three places (i.e., finished in the fourth and lower places from the top), step S14 results in No, and the process is terminated.

Meanwhile, in step S23, the subset creating unit 113 determines whether or not the game result of the first game, included in the processing result in S21, was the predetermined result. Here, the criterion for the determination in S23 is the same as the criterion for the determination in step S14. That is, in the case where the character selected by the player finished within the top three places, step S23 results in Yes, and the process proceeds to step S24. Meanwhile, in the case where the character selected by the player failed to finish within the top three places (i.e., finished in the fourth and lower places from the top), step S23 results in No, and the process is terminated.

In step S24, the subset creating unit 113 creates a subset on the basis of the game result of the first game, included in the processing result in step S21.

In step S25, the second-game control unit 114 performs processing concerning the second game on the basis of the player selections included in the notification received in step S12 and the subset created in step S24. Then, the second-game control unit 114 outputs the processing result to the game-running control unit 111.

In step S26, the game-running control unit 111 sends a control instruction concerning how the second game is to be run to the player terminal 2 on the basis of the processing result in step S25.

In step S15, the game-running execution unit 211 runs the second game on the basis of the control instruction for the second game, sent in step S26.

The multiple-game linkage process is executed through the above-described cooperation between the player terminal 2 and the server 1.

In this case, in this embodiment, the character object to be used for displaying a character in the second game is determined by creating a subset on the basis of the game result of the first game in step S24. That is, in the case where the player finished in a high place in the first game, a character object desired by the player is used as the character object to be used for character display in the second game.

That is, in order to play the second game via the desired character object and to have more fun in the second game, the player needs ideas and preparations for improving the game result of the first game. Thus, with this embodiment, it is possible to enhance the fun of both the first game and the second game for the player.

That is, with this embodiment, it becomes possible to improve the motivation of the player concerning the game result in relation to a character object.

Furthermore, in this embodiment, the determinations in steps S14 and S23 are performed, and in the case where the character selected by the player is included in the subset (i.e., finished in the fourth and lower places from the top in the first game), the second game is not displayed on the player terminal 2. That is, in this embodiment, in the case where the character selected by the player failed to finish within the top three places, the player is not allowed to play and watch the second game. Thus, according to this embodiment, playing and watching the second game in itself becomes a purpose for the player, which serves to further improve the motivation concerning the game result of the first game.

[Example Displays of First Game and Second Game]

Next, display transitions that occur as the games are run in the first game and the second game run in the multiple-game linkage process will be described with reference to FIGS. 5 to 12.

Figure 5:
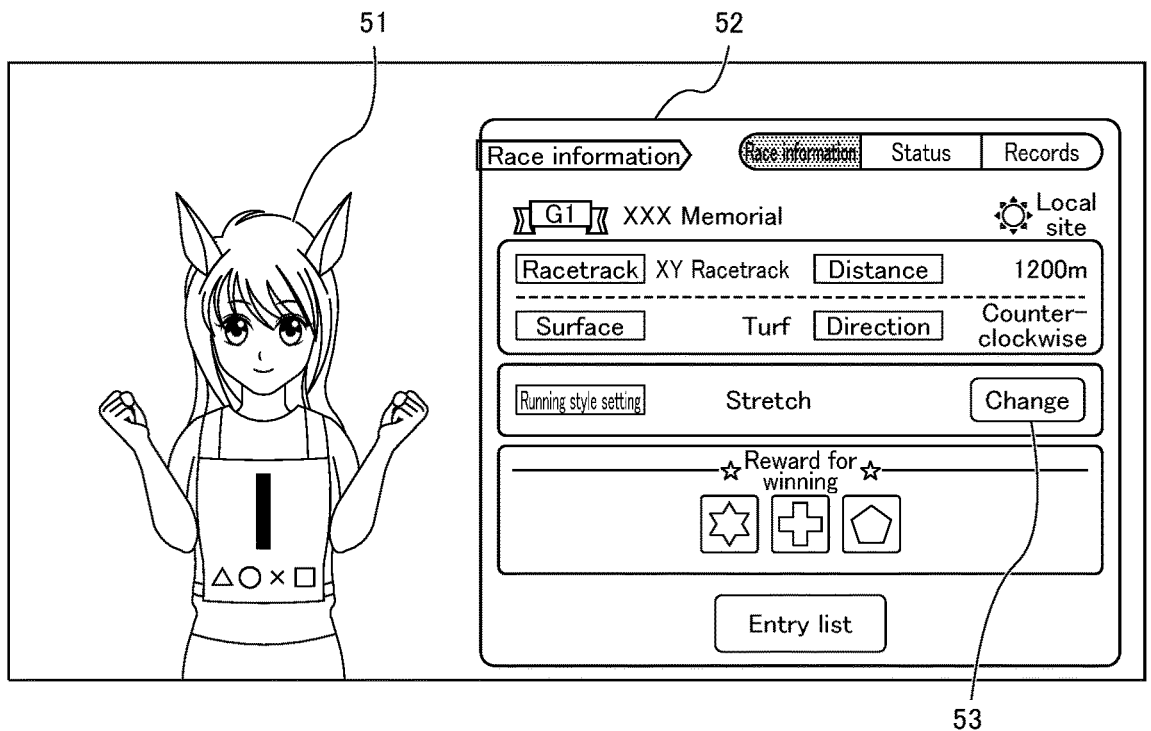
FIG. 5 is a schematic illustration showing an example display of race information in a first game run in the multiple-game linkage process.
Figure 6:
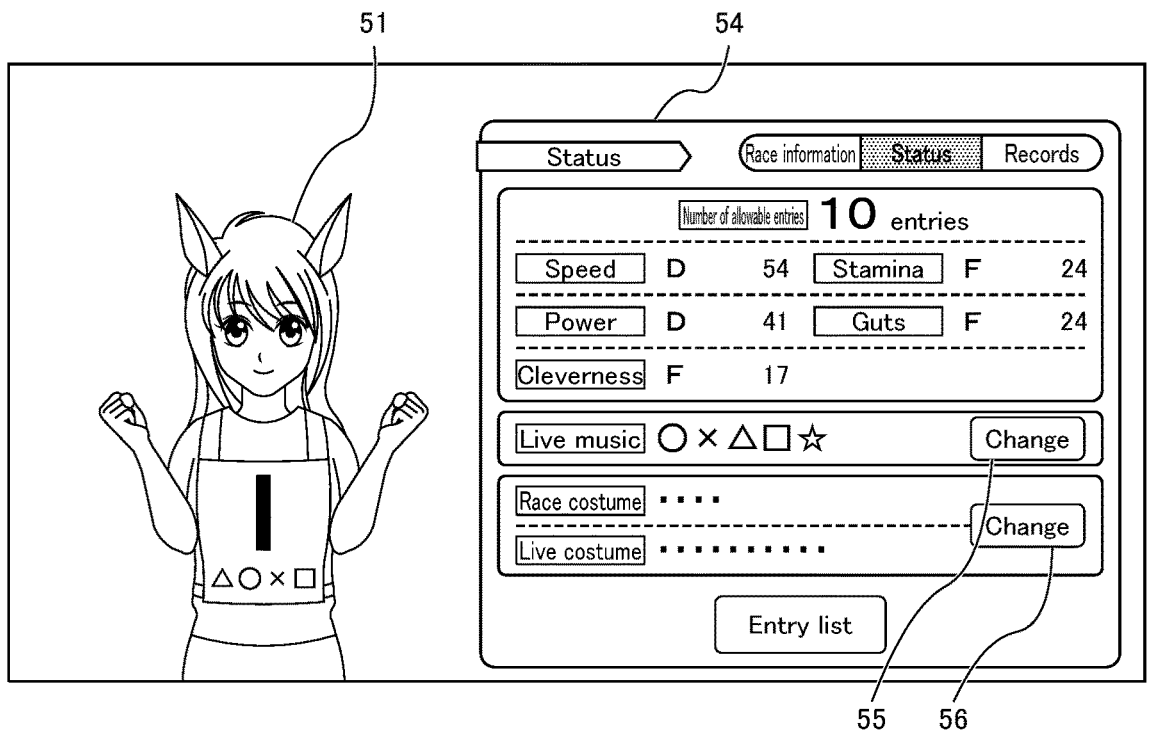
FIG. 6 is a schematic illustration showing an example display of status information in the first game run in the multiple-game linkage process.

FIG. 5 is a schematic illustration showing an example display of race information in the first game run in the multiple-game linkage process, which is displayed in response to a screen selection operation performed by the player in step S11 in FIG. 6. In this example display, a character currently selected by the player is displayed, as indicated by a display 51. This character wears, for example, a bib corresponding to an entry number in a race. Furthermore, information concerning the race in which the player participates in the first game is displayed, as indicated by a display 52. For example, the name of the race, the grade of the race, racetrack information, the weather, items that can be acquired as a reward for winning, etc. are displayed. Furthermore, the player can change the running style of the character on the screen by operating a button shown by a display 53. The running style can be selected, for example, from running styles for horse racing, such as front runner, stretch runner, and closer. The running style corresponds to a strategy that determines how to run in the race.

FIG. 6 is a schematic illustration showing an example display of status information in the first game run in the multiple-game linkage process, which is displayed in response to a screen selection operation performed by the player in step S11 in FIG. 6. In this example display, a character is shown by a display 51, similarly to FIG. 5. Furthermore, the status of this character is displayed, as indicated by a display 54. For example, as the status of the character, the number of allowable race entries of the character, as well as the capability values of the character, such as speed, power, cleverness, stamina, and guts, are displayed. The player can check the status of the character by referring to the display 54.

Furthermore, in this screen, the player can change the piece of music to be used in the second game by operating a button shown by a display 55.

Furthermore, in this screen, the player can change a character object (a costume as an example here) to be used in the first game or the second game by operating a button shown by a display 56.

Figure 7:
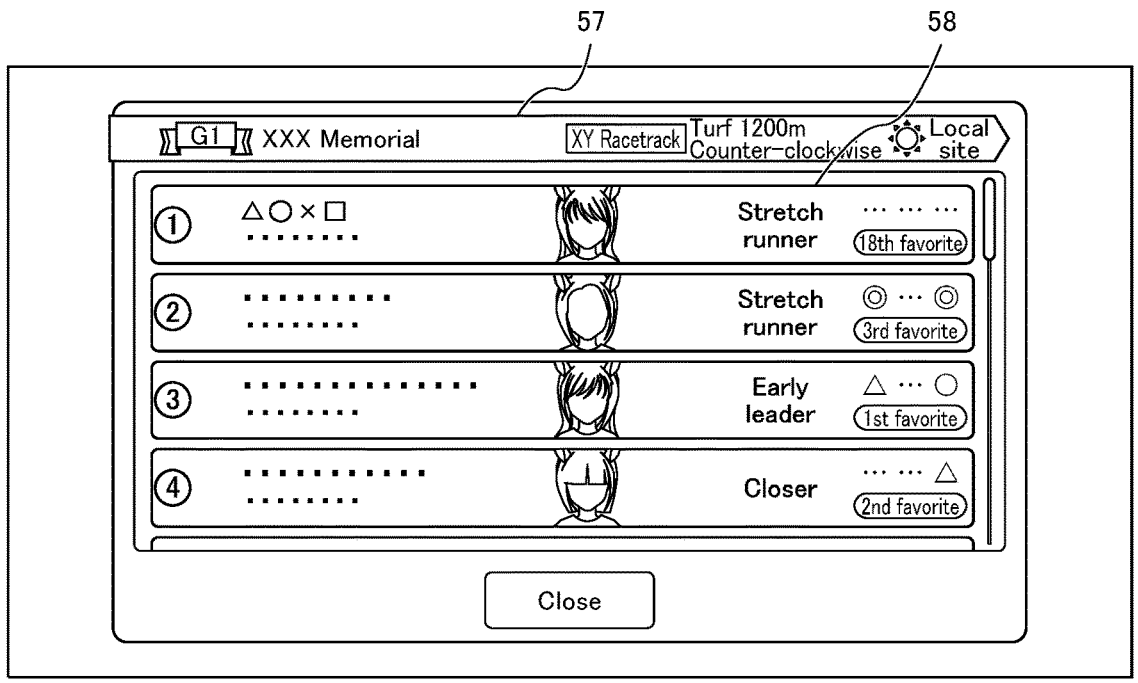
FIG. 7 is a schematic illustration showing an example display of a pre-start preliminary screen in the first game run in the multiple-game linkage process.

FIG. 7 is a schematic illustration showing an example display of a pre-start preliminary screen in the first game run in the multiple-game linkage process, which is displayed in response to a screen selection operation performed by the player in step S11 in FIG. 6. In this example display, information concerning the race in which the player participates in the first game is displayed, as indicated by a display 57. For example, information included in the display 52 in FIG. 5 is displayed. Furthermore, characters registered to participate in the race are displayed, as indicated by a display 58. For example, the running styles of the individual characters, the odds of the individual characters, etc. are displayed. The player can check the running styles of the other characters, the odds, etc. by referring to the display 58.

Figure 8:
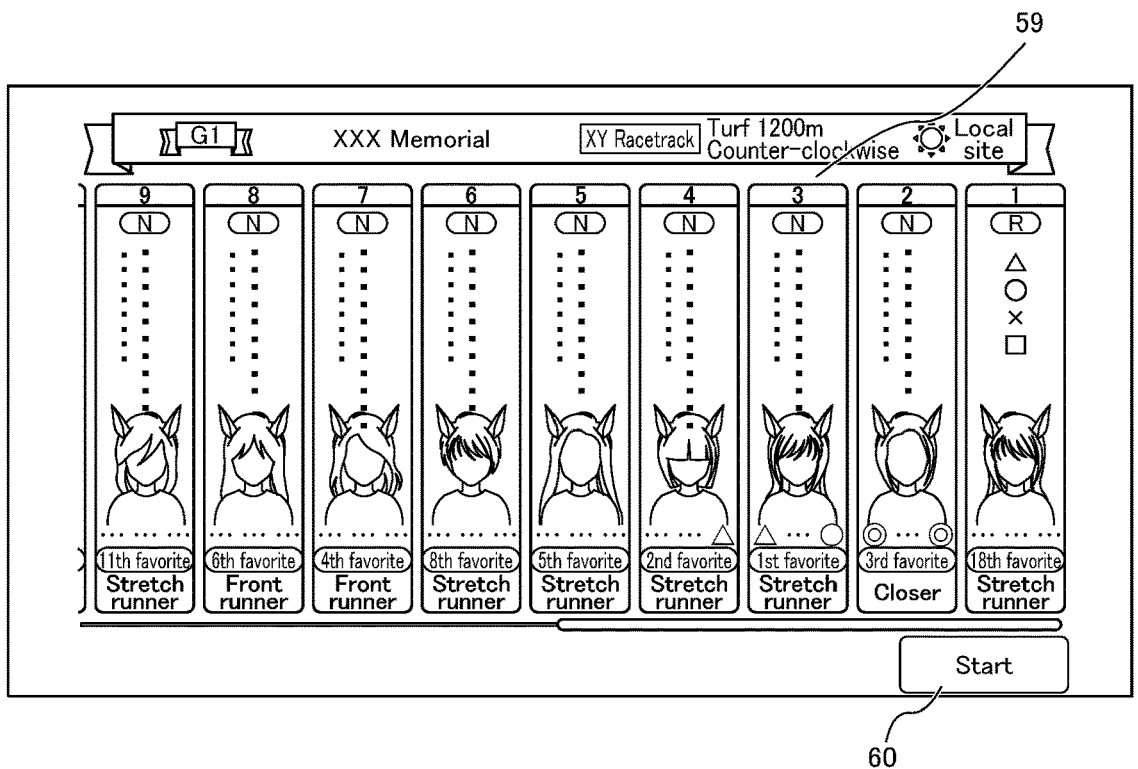
FIG. 8 is a schematic illustration showing an example display of an entry list in the first game run in the multiple-game linkage process.

FIG. 8 is a schematic illustration showing an example display of an entry list in the first game run in the multiple-game linkage process, which is displayed when the first game is started in step S13 in FIG. 6. In this example display, the same information as that included in the display 57 and the display 58 in FIG. 7 is displayed, as indicated by a display 59. In this screen, the player can start the race in the first game by operating a button shown by a display 60.

Figure 9:
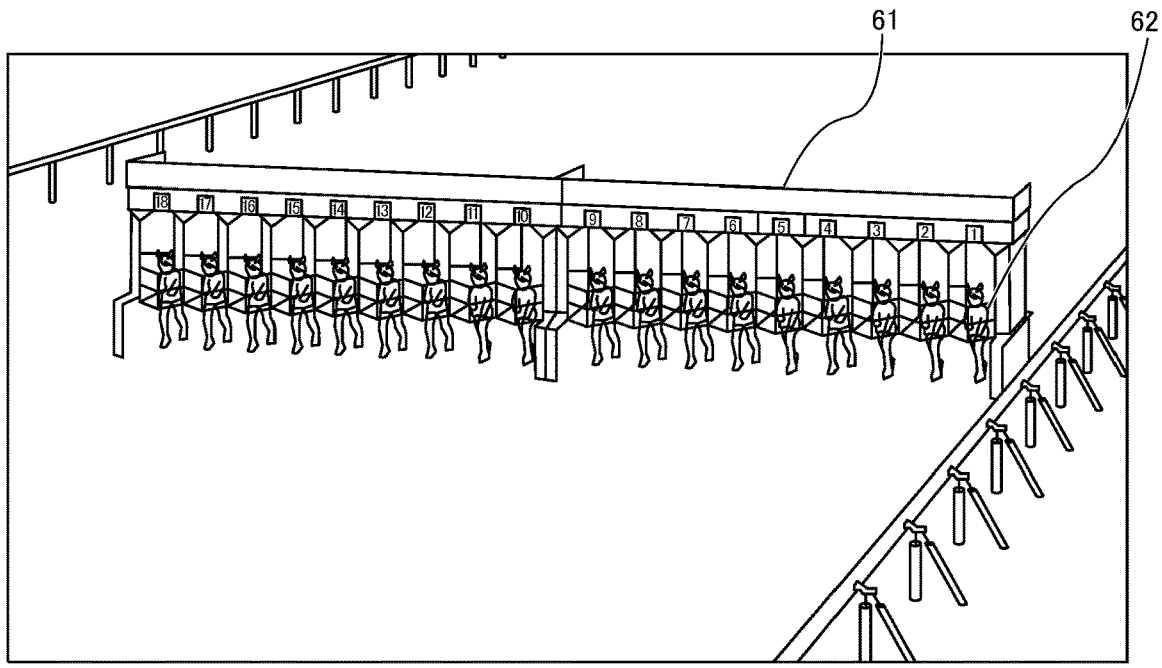
FIG. 9 is a schematic illustration showing an example display at the time of the start of a race in the first game run in the multiple-game linkage process.

FIG. 9 is a schematic illustration showing an example display at the start of the race in the first game run in the multiple-game linkage process, which is displayed when the race is started in the first game in step S13 in FIG. 6. In this example display, as rendering of the race, as indicated by a display 61 and a display 62, the individual characters (corresponding to the display 62) are preparing for the start of the race at a starting gate (corresponding to the display 61). Each of the characters is displayed by using polygon-based three-dimensional computer graphics by utilizing a character object (a costume as an example here) selected by the player corresponding to that character.

Figure 10:
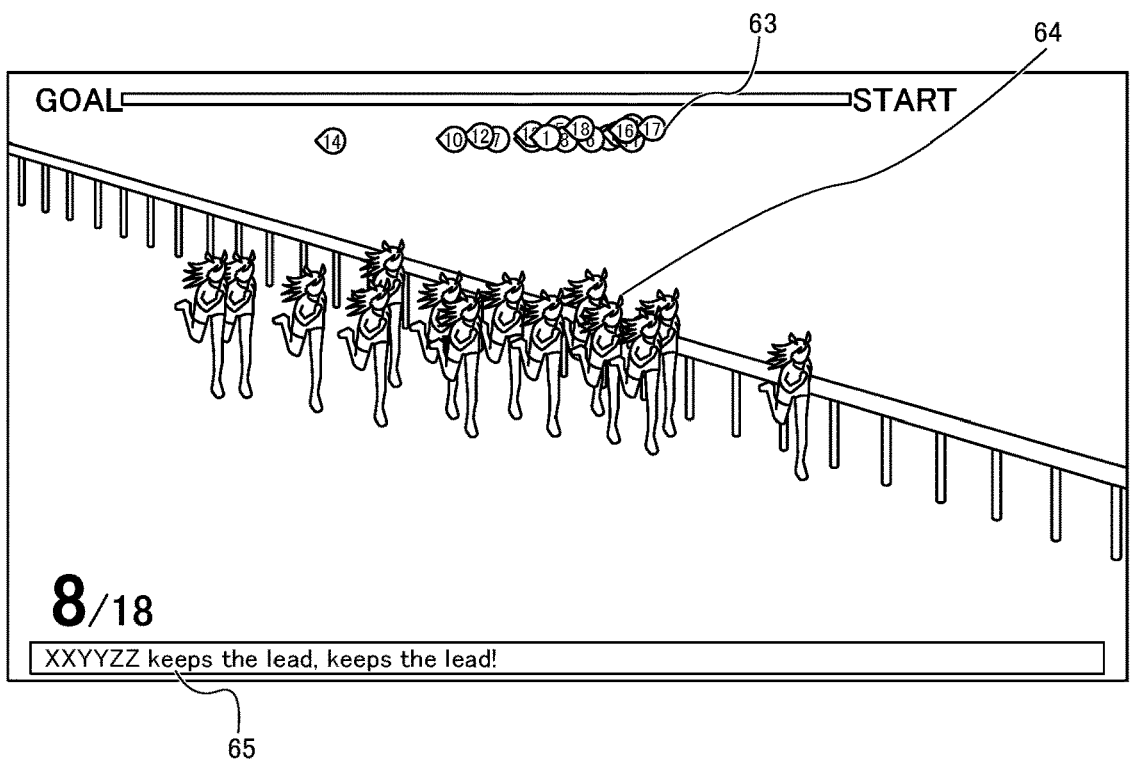
FIG. 10 is a schematic illustration showing an example display near the end of the race in the first game run in the multiple-game linkage process.

FIG. 10 is a schematic illustration showing an example display near the end of the race in the first game run in the multiple-game linkage process, which is displayed near the end of the race in the first game in step S13 in FIG. 6. In this example display, the current places of the individual characters are displayed in the form of the entry numbers thereof, as indicated by a display 63. Furthermore, how the individual characters are running is displayed, as indicated by a display 64. Furthermore, the place of the character selected by the player and an announcement concerning the race are displayed, as indicated by a display 65. The player can check the proceeding of the race by referring to this screen.

Figure 11:
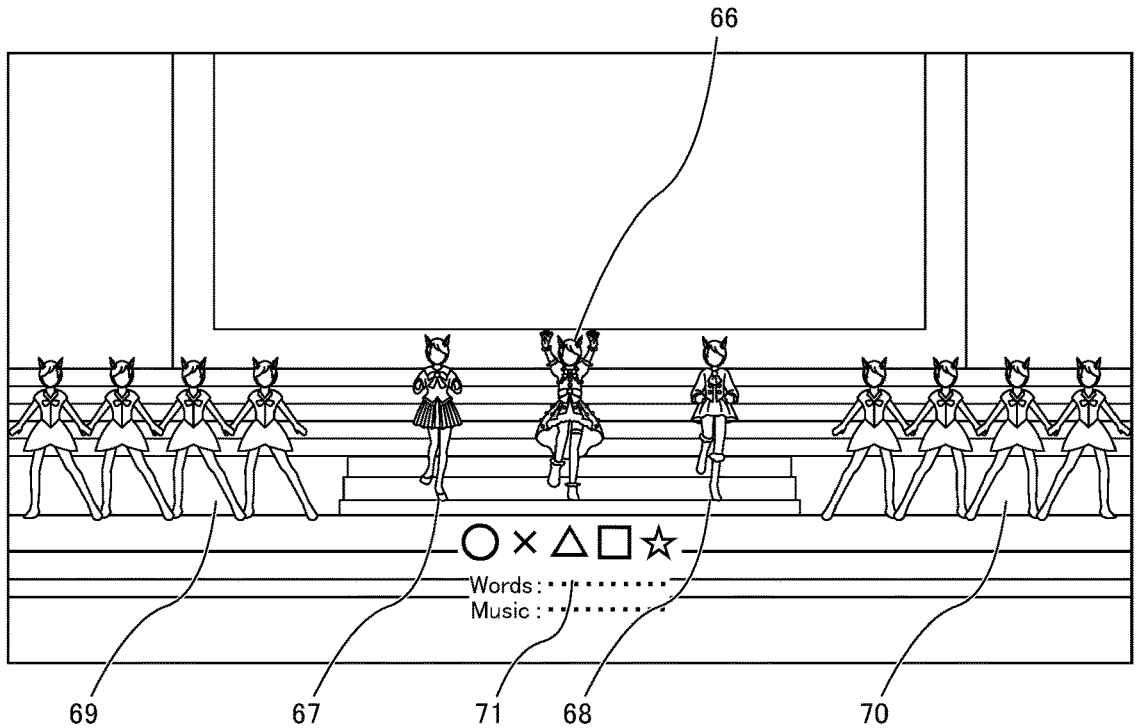
FIG. 11 is a schematic illustration showing an example display at the time of the start of a live performance in a second game run in the multiple-game linkage process.

FIG. 11 is a schematic illustration showing an example display at the start of a performance in accordance with a piece of music (hereinafter referred to as a "live performance") in the second game run in the multiple-game linkage process, which is displayed when the second game is started in step S15 in FIG. 6. In this example display, characters that finished within the top three places in the first game are disposed at the center of the stage, as indicated by a display 66, a display 67, and a display 68. These three characters are displayed by using polygon-based three-dimensional computer graphics by utilizing character objects (costumes as an example here) individually selected by the players corresponding to the individual characters.

Meanwhile, characters that finished in the fourth and lower places from the top in the first game (i.e., characters included in the subset) are displayed as what are called back dancers by using polygon-based three-dimensional computer graphics by utilizing a general character object (a costume as an example here) corresponding to a game medium that determines the content of the second game, as indicated by a display 69 and a display 70. Furthermore, the title, the name of the lyricist, and the name of the composer of the piece of music used in the live performance are displayed, as indicated by a display 71.

As described above, the characters that finished within the top three places in the first game are displayed by utilizing the character objects (costumes as an example here) selected by the players and give a performance at conspicuous positions at the center, which serves to enhance the degree of satisfaction of players who have affection for characters. This makes it possible to improve the motivation of the player concerning the game result of the first game, as described earlier.

Figure 12:
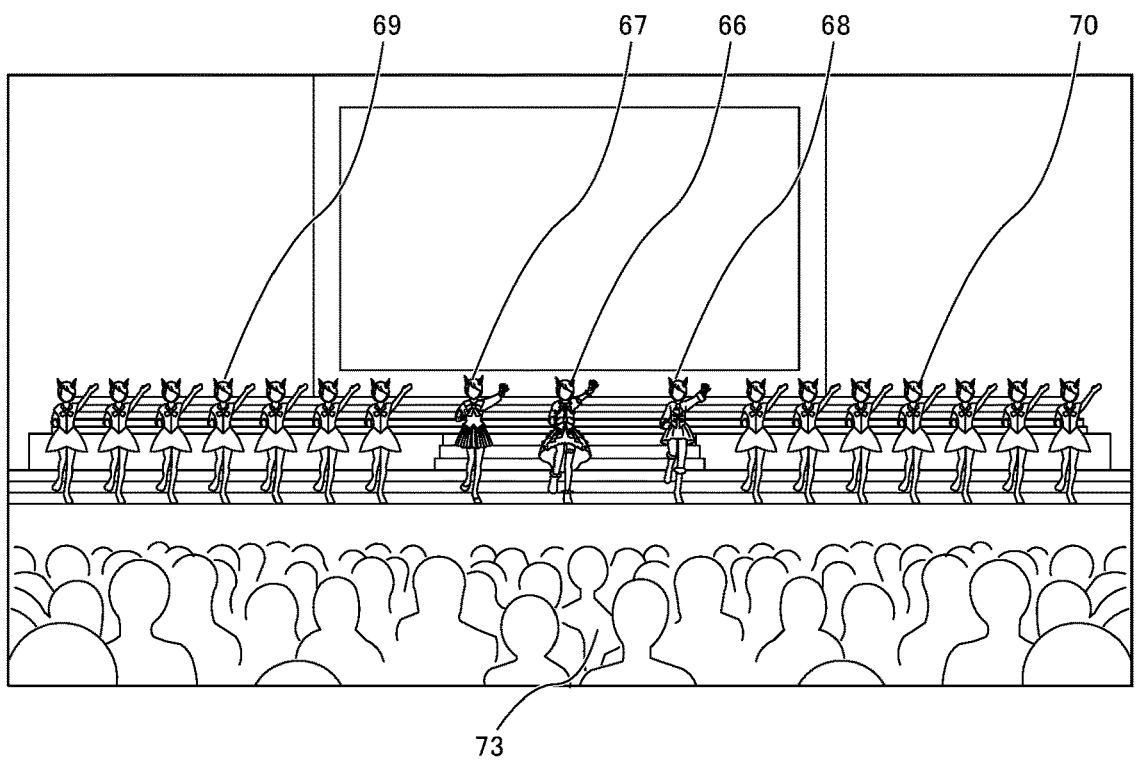
FIG. 12 is a schematic illustration showing an example display of a whole live performance scene in the second game run in the multiple-game linkage process.
Figure 13:
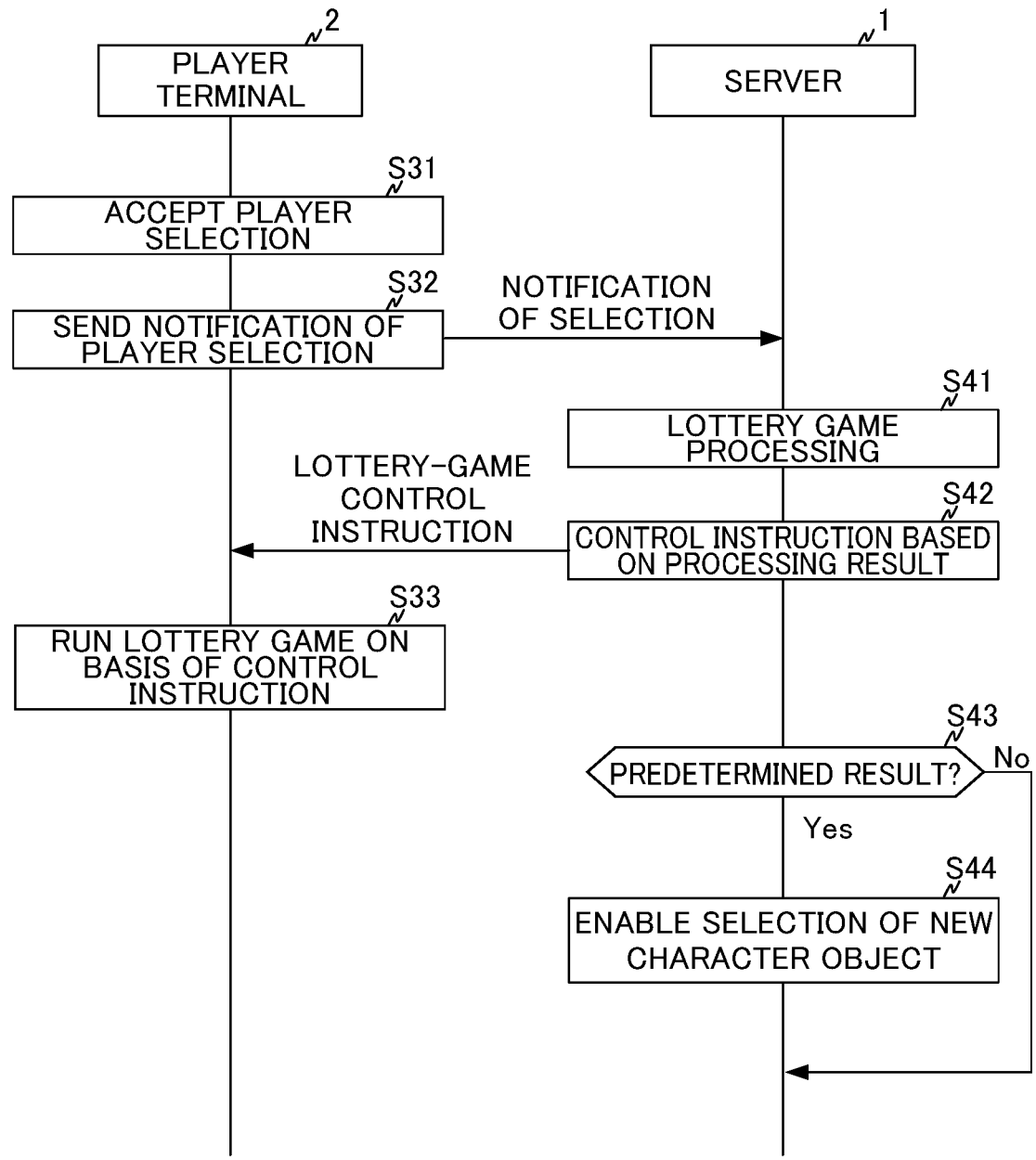
FIG. 13 is a sequence diagram for explaining the flow of the lottery game process executed by the server and the player terminal in FIG. 2 having the functional configurations in FIG. 3.

FIG. 12 is a schematic illustration showing an example display of a whole live performance scene in the second game run in the multiple-game linkage process, which is displayed in accordance with camera work in the second game in step S15 in FIG. 6. The displays 66 to 70 have been described above with reference to FIG. 11. Furthermore, in this example display, a display simulating the audience enjoying the live performance is presented, as indicated by a display 73. In this case, it is possible to provide a greater sense of presence in the live performance by animating the audience indicated by the display 73 in accordance with the piece of music. Note that the audience may be displayed, for example, in the form of chemical lights or penlights waved in the hands of the audience instead of human shapes.

Then, a performance such as one in which the characters perform a dance choreographed in accordance with the piece of music is realized by using animation utilizing 3D polygons. As the motions in the performance such as dancing, different motions are set for individual positions in the live performance. For example, the motions are generated through motion capture, which is realized by a means such as attaching sensors to a person that actually gives a performance such as dancing and measuring the motions.

In this case, although motions of all the parts of the characters may be generated in advance and animation may be realized by utilizing 3D polygons in accordance with the motions, animation may also be realized by performing physical computations in real time for motions of some parts of the characters. For example, for motions of some portions (e.g., skirt and hair portions) of the characters, animation may be realized by performing physical computation in real time while taking into account gravity, inertial forces, centrifugal forces, etc. in a virtual physical space. This makes it possible, for example, to add variations in the expressions of the skirt and hair portions fluttering even in the case where a plurality of characters dance with the same motion, thereby displaying the individual characters in differentiated fashions. Furthermore, it is possible to reduce the costs required in generating motions for all the parts of the characters by motion capture.

Furthermore, regarding the display of the live performance, which simulates images in which the stage is captured with a camera in this case, although the camera position, the image capturing angle, and the angle of view relative to the stage may be fixed, the camera position, the image capturing angle, and the angle of view may be varied in accordance with predetermined camera work in order to add a sense of presence.

Next, the displays of the characters, described above with reference to FIGS. 5 to 12, will be described in more detail. In this embodiment, all the characters are displayed by using 3D polygons. Each character is managed on the basis of a character ID and has individually unique head data. In this case, the body data of each character may also be individually unique; however, this requires a large amount of data and a large amount of computation for performing display by using 3D polygons. Thus, in the case where the characters that finished in the fourth and lower places from the top in the first game (i.e., the characters included in the subset) are displayed as back dancers, who are not so conspicuous in the live performance, data of the bodies of the individual characters may be partially shared.

In this case, a plurality of kinds of polygon data corresponding to heights, chest girths, and weights may be prepared as shared data rather than data unique to individual characters, and then each character may be displayed by using polygon data selected from the plurality of kinds of polygon data. That is, each character should be displayed by combining shared polygon data. Similarly, a plurality of kinds of texture data corresponding to skin colors, etc. may be prepared, and each character may be displayed by using texture data selected from the plurality of kinds of texture data.

Meanwhile, in the case where the characters that finished within the top three places in the first game are displayed by utilizing character objects (e.g., costumes as an example here) selected by the players and where the costumes are unique to individual characters, polygon data and texture data of the bodies unique to individual characters may be prepared, and each character may be displayed by using the unique polygon data and texture data.

With this feature, the bodies of the characters that finished within the top three places in the first game become character-specific, which serves to further improve the degrees of satisfaction of players who have affection for characters. Meanwhile, by displaying the other characters by using shared body data, it is possible as a whole to reduce the amount of data and the amount of computation required in order to perform display by using 3D polygons.

Furthermore, similarly, in order to reduce the amount of data and the amount of computation required in order to perform display by using 3D polygons, the amount of data may also be varied for character objects (costumes as an example here) between the costumes of the characters that finished within the top three places in the first game and the costumes of the characters that finished in the fourth and lower places from the top in the first game. For example, the amount of data of the costumes of the characters that finished in the fourth and lower places from the top in the first game may be less than the amount of data of the costumes of the characters that finished within the top three places. In particular, in the case where the number of characters that finished in the fourth and lower places from the top in the first game is large, by reducing the amount of data of the costumes of those characters, it is possible to considerably reduce the amount of data and the amount of computation required in order to perform display by using 3D polygons.

Furthermore, in the case where animation is realized by performing physical computations in real time for motions of some parts of characters, as described earlier, the parts requiring physical computations may be fewer for the characters that finished in the fourth and lower places from the top in the first game than for the characters that finished within the top three places. Also in this case, it is possible to considerably reduce the amount of data and the amount of computation required in order to perform display by using 3D polygons.

To sum up what has been described above, the load involved in displaying the characters that finished in the fourth and lower places from the top in the first game should be less than the load involved in displaying the characters that finished within the top three places in the first game. In order to reduce the load involved in displaying characters, for example, each item of data for displaying the characters that finished in the fourth and lower places from the top in the first game should relatively satisfy the following "conditions for reducing the load involved for displays" when compared with each item of data for displaying the characters that finished within the top three places in the first game.

"Conditions for reducing the load involved in displays"
The number of vertices of 3D polygons is small.
The number of bones for moving 3D polygons is small.
The number of joints for moving 3D polygons is small.
The texture resolution is low.
The amount of texture data is small.
Lighting processing is simpler.
Material processing is simpler.
Other rendering processing is simpler and involves a lower load.

[Lottery Game Process]

The lottery game process will be described with reference to FIG. 13. The lottery game process is executed, for example, when the player has performed an operation for requesting the execution of a lottery game.

In step S31, the player-selection notification unit 212 accepts a player selection. Specifically, the player-selection notification unit 212 accepts a selection of the price (e.g., the amount of in-game currency) for playing the lottery game. Furthermore, in step S32, the player-selection notification unit 212 sends the content of the accepted player selection to the server 1 to notify the server 1 of the content of the player selection.

In step S41, the lottery-game control unit 115 performs processing concerning the lottery game on the basis of the player selection included in the notification received in step S32. Then, the lottery-game control unit 115 outputs the processing result to the game-running control unit 111.

In step S42, on the basis of the processing result in step S41, the game-running control unit 111 sends a control instruction concerning how the lottery game is to be run to the player terminal 2.

In step S33, the game-running execution unit 211 runs the lottery game on the basis of the control instruction for the lottery game, sent in step S42.

Meanwhile, in step S43, the lottery-game control unit 115 determines whether or not the game result of the lottery game, included in the processing result in step S41, was a predetermined result. Here, in this embodiment, it is determined that the game result of the lottery game was the predetermined result in the case where the game result indicates that it has become possible to select a new character object (a costume as an example here). That is, in the case where the game result of the lottery game indicates that it has become possible to select a new character object (a costume as an example here), step S43 results in Yes, and the process proceeds to step S44. Meanwhile, in the case where the game result of the lottery game does not indicate that it has become possible to select a new character object (a costume as an example here), step S43 results in No, and the process is terminated.

In step S44, the lottery-game control unit 115 rewrites the data in the terminal-management-data storage unit 181 so as to make the new character object (a costume as an example here) a character object that can be selected by the player.

The data rewriting in step S44 in the lottery game process described above enables the player to select the character object in multiple-game linkage processes that are executed subsequently. Note that, as mentioned in the description of the lottery-game control unit 115, the player may be granted the right to select a specific kind of piece of music or the right to select a specific kind of character through the lottery game.

The embodiment of the present invention has been described above. Note, however, that the present invention is not limited to the embodiment described above and that the present invention encompasses modifications, improvements, etc. within a scope in which it is possible to achieve the object of the present invention. That is, the present invention is widely applicable to a variety of games.

Furthermore, although the above embodiment has been described in the context of an example where the server 1 or the player terminal 2 to which the present invention is applied is a server device, a game machine, or a smartphone, there is no particular limitation thereto. The present invention is applicable to electronic appliances having information processing functions in general.

Furthermore, the series of processing steps described above can be executed by hardware or by software.

In other words, the functional configurations shown in FIG. 3 is merely an example, and there is no particular limitation thereto. That is, it suffices to provide the server 1 and the player terminal 2 with functions that make it possible to execute the series of processing steps described above as a whole, and the choice of specific functional blocks for realizing those functions is not limited to that in the example in FIG. 3.

Furthermore, the functional configurations of the server 1 and the player terminal 2 may be realized by a single device. Alternatively, the functions of the server 1 may be distributed to a plurality of server devices and realized by the plurality of devices.

Furthermore, each functional block may be implemented by hardware alone, by software alone, or by a combination of hardware and software.

The functional configurations in the embodiment are realized by using a processor that executes computational processing. Processors that can be used in the embodiment include a processor constituted of only an information processing device of various kinds, such as a single processor, a multiprocessor, or a multicore processor, as well as a combination of one of these various kinds of processing devices and a processing circuit such as an ASIC (Application Specific Integrated Circuit) or an FPGA (Field-Programmable Gate Array).

In the case where the series of processing steps is executed by software, a program constituting the software is installed in a computer or the like from a network or a recording medium.

The computer may be a computer embedded in special hardware. Alternatively, the computer may be a computer that is capable of executing various functions when various programs are installed therein, such as a general-purpose personal computer.

A recording medium including such a program is implemented by the removable medium 100 in FIG. 2, which is distributed separately from the main unit of a device in order to provide a player with the program, or is implemented by a recording medium or the like that is provided to a player in a state embedded in advance in the main unit of a device. The removable medium 100 is implemented, for example, by a magnetic disk (including a floppy disk), an optical disk, or a magneto-optical disk. The optical disk is implemented, for example, by a CD-ROM (Compact Disk-Read Only Memory), a DVD (Digital Versatile Disk), or a Blu-ray (registered trademark) disc. The magneto-optical disk is implemented, for example, by an MD (Mini-Disk). Furthermore, the recording medium that is provided to a player in a state embedded in advance in the main unit of a device is implemented, for example, by the ROM 12 in FIG. 2 or the ROM 22 in FIG. 2, in which a program is recorded, or a semiconductor memory included in the storage unit 18 in FIG. 2 or the storage unit 28 in FIG. 2.

In this description, steps defining the program recorded in the recording medium may include processing that is not necessarily executed sequentially but is executed in parallel or individually, as well as processing that is executed sequentially in order. Furthermore, steps that are executed according to the program recorded in the recording medium may be executed in an arbitrary order within a scope not departing from the spirit of the present invention.

Although the embodiment of the present invention has been described above, the embodiment is merely an example and does not limit the technical scope of the present invention. The present invention can be embodied in various other forms, and it is possible to make various modifications, such as omission and substitution, without departing from the spirit of the present invention. These embodiments and modifications thereof are encompassed in the scope and spirit of the invention disclosed in this description, etc. and are encompassed in the scope of the invention recited in the claims and equivalents thereof.

For example, the embodiment of the present invention may be modified as in the following modifications.

First Modification

The above-described embodiment is a client-server system in which the player terminal 2 and the server 1 cooperate with each other to execute the multiple-game linkage process and the lottery game process. Without limitation to the embodiment, a multiple-game linkage process and a lottery game process may be executed by a single device. This modification will be described with reference to FIGS. 14 to 16.

Note that, in the descriptions of this modification and the following other modifications, repeated descriptions of commonalities with the above-described embodiment will be omitted, and what is specific to each modification will be described in detail.

<Hardware Configuration>

The hardware configuration of an information processing device 3 that realizes this modification will be described. The information processing device 3 includes a CPU 31, a ROM 32, a RAM 33, a bus 34, an input/output interface 35, an input unit 36, an output unit 37, a storage unit 38, a communication unit 39, and a drive 40. These hardware units individually have functions equivalent to the functions of the hardware units having the same names and different reference signs in the server 1 and the player terminal 2 described above. Thus, the hardware units are not shown, and repeated descriptions thereof will be omitted. Note that, in this modification, since the communication unit 39 is not necessary, the communication unit 39 may be omitted.

The information processing device 3 may be realized, for example, by an installed game machine, a portable game machine, or a personal computer.

<Functional Configuration>

The functional configuration of the server 1 and the functional configuration of the player terminal 2 will be described with reference to the drawings.

Figure 14:
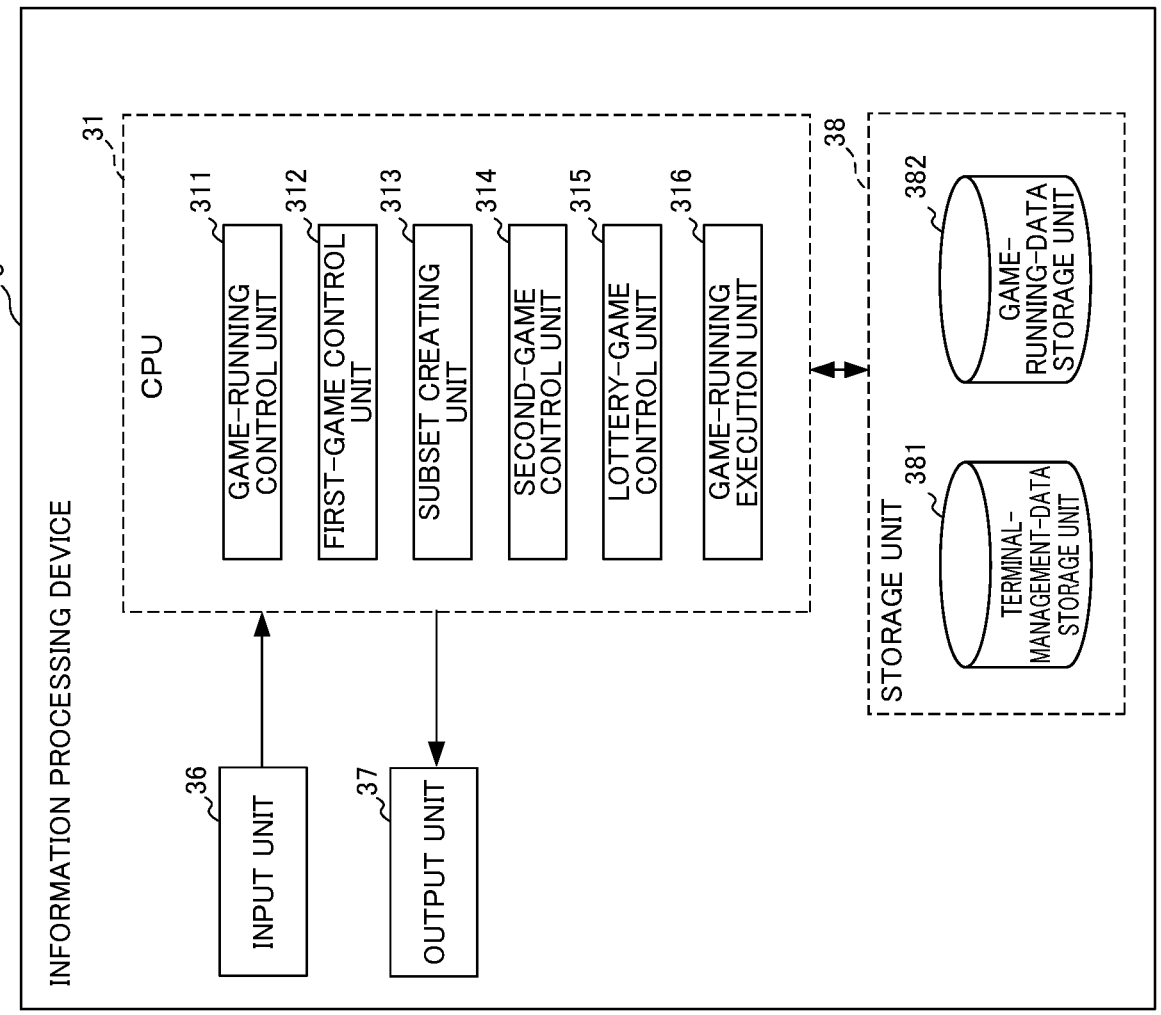
FIG. 14 is a functional block diagram showing, of the functional configuration of an information processing device according to a modification of the embodiment of the present invention, a functional configuration for executing a multiple-game linkage process and a lottery game process.

FIG. 14 is a functional block diagram showing, of the functional configuration of the information processing device 3, a functional configuration for executing processes such as a multiple-game linkage process and a lottery game process. In the case where the multiple-game linkage process and the lottery game process are executed, the CPU 31 functions as a game-running control unit 311, a first-game control unit 312, a subset creating unit 313, a second-game control unit 314, a lottery-game control unit 315, and a game-running execution unit 316, as shown in FIG. 14. Furthermore, a terminal-management-data storage unit 381 and a game-running-data storage unit 382 are set in an area of the storage unit 38.

These functional blocks individually have functions equivalent to the functions of the functional blocks having the same names and different reference signs in the server 1 and the player terminal 2 described above. Thus, repeated descriptions will be omitted. As a difference, however, since there is no need for a notification between devices, a functional block corresponding to the player-selection notification unit 212 is not included.

[Operations]

Figure 15:
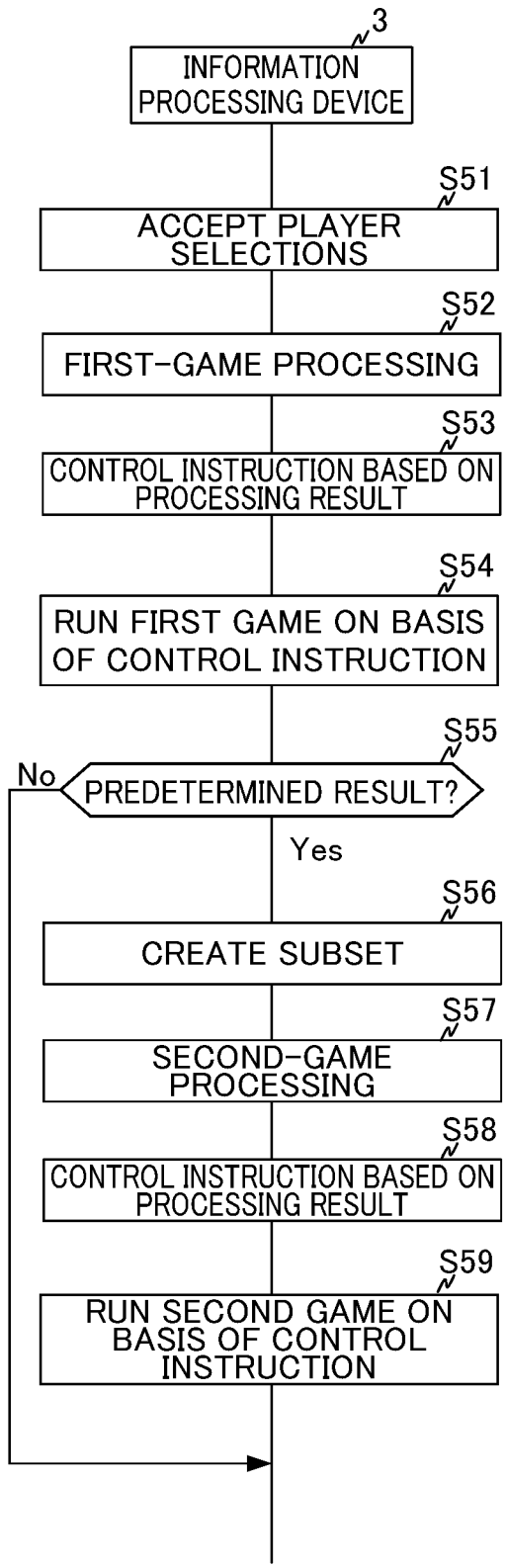
FIG. 15 is a sequence diagram for explaining the flow of the multiple-game linkage process executed by the information processing device having the functional configuration in FIG. 14.
Figure 16:
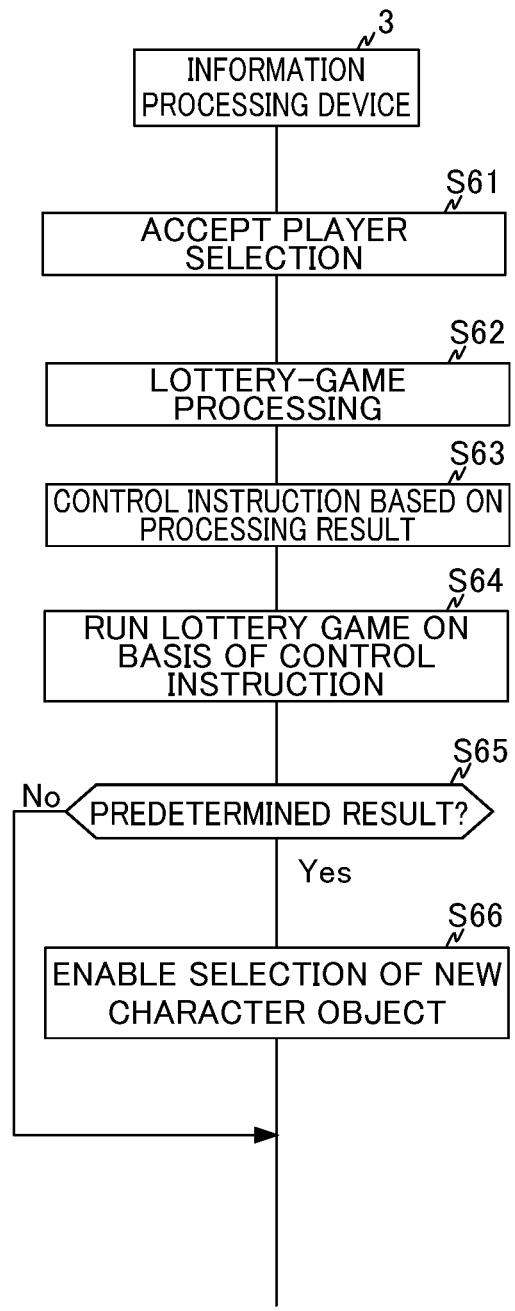
FIG. 16 is a sequence diagram for explaining the flow of the lottery game process executed by the information processing device having the functional configuration in FIG. 14.

The functional blocks of the information processing device 3 have been described above. Next, the operations in the multiple-game linkage process and the lottery game process executed by the information processing device 3 will be described with reference to FIGS. 15 and 16. Here, FIG. 15 is a sequence diagram for explaining the flow of the multiple-game linkage process in this modification. Furthermore, FIG. 16 is a sequence diagram for explaining the flow of the lottery game process in this modification.

<Multiple-Game Linkage Process>

First, the multiple-game linkage process will be described with reference to FIG. 15. The multiple-game linkage process is executed, for example, when the player has performed an operation for requesting the execution of the first game.

In step S51 (corresponding to step S11 in FIG. 6), the game-running control unit 311 accepts player selections. In step S52 (corresponding to step S21 in FIG. 6), the first-game control unit 312 performs processing concerning the first game on the basis of the player selections accepted in step S51. Then, the first-game control unit 312 outputs the processing result to the game-running control unit 311.

In step S53 (corresponding to step S22 in FIG. 6), the game-running control unit 311 outputs a control instruction concerning how the first game is to be run to the game-running execution unit 316 on the basis of the processing result in step S52.

In step S54 (corresponding to step S13 in FIG. 6), the game-running execution unit 316 runs the first game on the basis of the control instruction for the first game, output in step S52.

In step S55 (corresponding to step S14 in FIG. 6), the game-running execution unit 316 determines whether or not the game result of the first game, included in the control instruction for the first game, output in step S52, was a predetermined result. Here, the criterion for the determination in step S55 is the same as the criterion for the determination in step S14. That is, in the case where the character selected by the player finished within the top three places, step S55 results in Yes, and the process proceeds to step S56. Meanwhile, in the case where the character selected by the player did not finish within the top three places (i.e., finished in the fourth or lower place from the top), step S55 results in No, and the process is terminated.

In step S56 (corresponding to step S24 in FIG. 6), the subset creating unit 313 creates a subset on the basis of the game result of the first game, included in the processing result in step S52.

In step S57 (corresponding to step S25 in FIG. 6), the second-game control unit 314 performs processing concerning the second game on the basis of the player selections accepted in step S51 and the subset created in step S56. Then, the second-game control unit 314 outputs the processing result to the game-running control unit 311.

In step S58 (corresponding to step S26 in FIG. 6), the game-running control unit 311 outputs a control instruction concerning how the second game is to be run to the second-game control unit 314 on the basis of the processing result in step S57.

In step S59 (corresponding to step S15 in FIG. 6), the second-game control unit 314 runs the second game on the basis of the control instruction for the second game, output in step S58.

With the operation described above, it is possible to execute the multiple-game linkage process with the information processing device 3 alone. The advantage of this process is the same as that in the embodiment described above.

[Lottery Game Process]

The lottery game process will be described with reference to FIG. 16. The lottery game process is executed, for example, when the player has performed an operation for requesting the execution of a lottery game.

In step S61 (corresponding to step S31 in FIG. 13), the lottery-game control unit 315 accepts a player selection. Specifically, the lottery-game control unit 315 accepts a selection of a price (e.g., the amount of in-game currency) for playing the lottery game.

In step S62 (corresponding to step S41 in FIG. 13), the lottery-game control unit 315 performs processing concerning the lottery game on the basis of the player selection accepted in step S61. Then, the lottery-game control unit 315 outputs the processing result to the game-running control unit 311.

In step S63 (corresponding to step S42 in FIG. 13), the game-running control unit 311 outputs a control instruction concerning how the lottery game is to be run to the game-running execution unit 316 on the basis of the processing result in step S62.

In step S64 (corresponding to step S33 in FIG. 13), the game-running execution unit 316 runs the lottery game on the basis of the control instruction for the lottery game, output in step S63.

In step S65 (corresponding to step S43 in FIG. 13), the game-running control unit 311 determines whether or not the game result of the lottery game, included in the control instruction for the lottery game, sent in step S63, was a predetermined result. Here, the criterion for the determination in step S65 is the same as the criterion for the determination in step S43. That is, in the case where the game result of the lottery game indicates that it has become possible to select a new character object (a costume as an example here), step S65 results in Yes, and the process proceeds to step S66. Meanwhile, in the case where the game result of the lottery game does not indicate that it has become possible to select a new character object (a costume as an example here, step S65 results in No, and the process is terminated.

In step S66 (corresponding to step S44 in FIG. 13), the lottery-game control unit 315 rewrites the data in the terminal-management-data storage unit 381 so as to make the new character object (a costume as an example here) a character object that can be selected by the player.

With the operation described above, it is possible to execute the lottery game process with the information processing device 3 alone. The advantage of this process is the same as that in the embodiment described above.

Second Modification

In the above-described embodiment, as the first game, a race game in which individual characters run and compete against each other to determine final places (i.e., an order of characters) is played. Without limitation thereto, a game of another form may be played as the first game.

For example, as a game of another form, a game of the form in which individual characters do not compete with each other until the end but in which individual characters play battles against each other in a large group and characters are eliminated as they lose, or a game of the form in which characters are eliminated as they make a predetermined error or the like, may be played as the first game. In this case, the places are determined from the bottom in order of elimination, and the character that survived to the end wins the first place. Furthermore, similarly to the race game, character objects to be used for displaying characters in the second game may be determined on the basis of the places.

As another example, a game of the form in which a plurality of teams play a battle against each other may be played as the first game. In this case, the subset creating unit 113 creates a subset consisting of the characters included in the defeated team. Thus, in the second game, the characters included in the defeated team are displayed as back dancers by utilizing general character objects. Meanwhile, the characters included in the winning team are displayed as main dancers disposed at the center of the stage by utilizing character objects selected by players. Note that, in the case of this example, each team may be constituted of a plurality of characters or of a single character. Furthermore, the number of constituent characters may be the same or different among the individual teams.

Third Modification

In the above-described embodiment, for the characters that finished within the top three places in the first game, the live performance in the second game is given by using pieces of music selected by the players. That is, in the case where the pieces of music selected by the individual players vary, the live performance in the second game is given on the individual player terminals 2 of the players having the characters within the top three places by using the individually different pieces of music selected by the individual players. This is because the case where the pieces of music for which the right to select has been granted vary among the individual players is taken into consideration.

However, without limitation thereto, for example, in the case where the pieces of music for which the right to select has been granted are the same among the individual players, the live performance in the second game may be given by using the same piece of music on the individual player terminals 2 of the players having the characters within the top three places. For example, the live performance in the second game may be given by using a piece of music selected by the player having the character that won the first place in the first game.

Fourth Modification

In the above-described embodiment, the subset creating unit 113 creates a single subset. Without limitation thereto, the subset creating unit 113 may create a plurality of subsets. For example, in the case where the number of characters that participated in the first game is ten, the subset creating unit 113 may create a first subset constituted of the characters in the fourth to sixth places from the top and may create a second subset constituted of the characters in the seventh to tenth places from the top. Then, in the live performance in the second game, the characters included in the first subset may be displayed by using a first general costume, and the characters included in the second subset may be displayed by using a second general costume. This serves to realize rendering variety in the live performance.

Fifth Modification

In the above-described embodiment, each character in the live performance is displayed by using polygon-based three-dimensional computer graphics. Without limitation thereto, each character may be displayed in the form of an animation by displaying a plurality of images (e.g., illustrations) while sequentially performing switching thereamong.

Also in this case, similarly to the case of using polygons, the display method may be varied between the characters that finished within the top three places in the first game and the characters that finished in the fourth and lower places from the top in the first game (i.e., the characters included in the subset). For example, for the characters that finished in the fourth and lower places in the first game, similarly to the case of using polygons, the heads may be displayed by using images unique to the individual characters, while displaying the bodies of the characters and some character objects (e.g., costumes as an example) by using shared images rather than images unique to the individual characters. Furthermore, in the case where each character is displayed in the form of an animation by performing switching sequentially among a plurality of images, although sequential image switching may be performed for the entire character image, sequential image switching may also be performed on a part-by-part basis for the character.

By utilizing shared images or switching partial images, as described above, it is possible to reduce the total amount of image data for displaying the characters.

EXPLANATION OF REFERENCE NUMERALS

1 Server
2 Player terminal
3 Information processing device
5 Network
11, 21, 31 CPU
12, 22, 32 ROM
13, 23, 33 RAM
14, 24, 34 Bus
15, 25, 35 Input/output interface
16, 26, 36 Input unit
17, 27, 37 Output unit
18, 28, 38 Storage unit
19, 29, 39 Communication unit
20, 30, 40 Drive
100 Removable medium
111, 311 Game-running control unit
112, 312 First-game control unit
113, 313 Subset creating unit
114, 314 Second-game control unit
115, 315 Lottery-game control unit
181, 381 Terminal-management-data storage unit Game-running execution unit
211, 316 Game-running execution unit
212 Player-selection notification unit
S Information processing system

The invention claimed is:

1. A non-transitory computer readable medium storing an information processing program for realizing, on a computer:
   a first-game control function that runs a first game while allowing a group of characters to participate therein;
   a subset creating function that creates, based on a game result of the first game, a subset consisting of some characters included in the group of characters from a universal set consisting of all characters included in the group of characters; and
   a second-game control function that runs a second game while performing control for the characters included in the subset created by the subset creating function so as to display, on a display medium, at least some of a first plurality of character objects in a form of character objects of a predetermined kind,
   wherein the first plurality of character objects of the predetermined kind are character objects involving lower load for display on the display medium than a second plurality of character objects of a kind that can be selected by a player.

2. A non-transitory computer readable medium storing an information processing program according to claim 1, wherein the second-game control function runs the second game while performing control for the characters not included in the subset created by the subset creating function so as to display, on the display medium, at least some character objects in a form of the second plurality of character objects of the kind selected by the player.

3. A non-transitory computer readable medium storing an information processing program according to claim 2, wherein the second-game control function runs the second game while performing control individually for the characters not included in the subset created by the subset creating function so as to display, on the display medium, at least some character objects in a form of a third plurality of character objects of kinds individually selected by different players.

4. A non-transitory computer readable medium storing an information processing program for realizing, on a computer:
   a first-game control function that runs a first game while allowing a group of characters to participate therein;
   a subset creating function that creates, based on a game result of the first game, a subset consisting of some characters included in the group of characters from a universal set consisting of all characters included in the group of characters; and
   a second-game control function that runs a second game while performing control for the characters included in the subset created by the subset creating function so as to display, on a display medium, at least some of character objects in a form of a first plurality of character objects of a predetermined kind,
   wherein the second-game control function runs the second game while performing control for the characters not included in the subset created by the subset creating function so as to display, on the display medium, at least some character objects in a form of a second plurality of character objects of a kind selected by a player, and wherein the first-game control function accepts a selection of the kind of the second plurality of character objects from the player before the first game is started.

5. A non-transitory computer readable medium storing an information processing program for realizing, on a computer:
- a first-game control function that runs a first game while allowing a group of characters to participate therein;
- a subset creating function that creates, based on a game result of the first game, a subset consisting of some characters included in the group of characters from a universal set consisting of all characters included in the group of characters; and
- a second-game control function that runs a second game while performing control for the characters included in the subset created by the subset creating function so as to display, on a display medium, at least some of character objects in a form of a plurality of character objects of a predetermined kind, wherein the second-game control function runs the second game while performing control for the characters not included in the subset created by the subset creating function so as to display, on the display medium, at least some character objects in a form of a second plurality of character objects of a kind selected by a player, and wherein the information processing program further realizes, on the computer, a lottery-game control function that performs a lottery while consuming an in-game currency owned by the player and that grants the player a right to select a specific kind of character object based on a result of the lottery.

6. A non-transitory computer readable medium storing an information processing program according to claim 1, wherein the second-game control function determines the first plurality of character objects of the predetermined kind based on a game medium that determines a content of the second game.

7. A non-transitory computer readable medium storing an information processing program according to claim 1, wherein the second-game control function determines whether or not to display the second game in which a character owned by a player participates, based on the game result of the first game played by the character owned by the player.

8. A non-transitory computer readable medium storing an information processing program according to claim 1,
- wherein the game result of the first game is a result that determines an order of characters that participated in the first game, and
- wherein the subset creating function creates the subset based on the order of the characters determined by the game result of the first game.

9. A non-transitory computer readable medium storing an information processing program for realizing, on a computer:
- a first-game control function that runs a first game while allowing a group of characters to participate therein;
- a subset creating function that creates, based on a game result of the first game, a subset consisting of some characters included in the group of characters from a universal set consisting of all characters included in the group of characters; and
- a second-game control function that runs a second game while performing control for the characters included in the subset created by the subset creating function so as to display, on a display medium, at least some of character objects in a form of a plurality of character objects of a predetermined kind, and wherein the subset creating function creates a plurality of subsets individually constituted of different characters, and wherein the second-game control function runs the second game while performing control for the characters included in the plurality of subsets created by the subset creating function so as to display, on the display medium, at least some character objects in a form of a second plurality of character objects of predetermined kinds that differ individually on a per-subset basis.

10. A server comprising:
- a processor; and
- a memory coupled to the processor, wherein the memory comprises instructions executable by the processor and configured to:
- run a first game while allowing a group of characters to participate therein;
- create, based on a game result of the first game, a subset consisting of some characters included in the group of characters from a universal set consisting of all characters included in the group of characters; and
- run a second game while performing control for the characters included in the subset so as to display, on a display medium, at least some character objects in a form of a first plurality of character objects of a predetermined kind,
- wherein the first plurality of character objects of the predetermined kind are character objects involving lower load for display on the display medium than a second plurality of character objects of a kind that can be selected by a player.

11. An information processing system comprising a terminal and a server communicatively connected to the terminal,
- wherein the terminal comprises:
  - a first processor;
  - a first memory coupled to the first processor, wherein the first memory comprises first instructions executable by the first processor and configured to:
    - accept, from a player, a selection of a character for participation in a first game and a second game, as well as a selection of a character object;
    - send, to the server, a notification of the character for participation in the first game and the second game, as well as the character object selected by the player; and
  - a display medium that displays the first game and the second game, and
- wherein the server comprises:
  - a second processor;
  - a second memory coupled to the second processor, wherein the second memory comprises second instructions executable by the second processor and configured to:
    - run the first game while allowing a group of characters including the character selected by the player, included in the notification, to participate therein;
    - create, based on a game result of the first game, a subset consisting of some characters included in the group of characters from a universal set consisting of all characters included in the group of characters;
    - run the second game while using, for the characters included in the subset, a first plurality of character objects of a predetermined kind other than the character object selected by the player, included in the notification, as some character objects; and perform control to display the first game and the second game on the display medium, wherein the first plurality of character objects of the predetermined kind are character objects involving lower load for display on the display medium than a second plurality of character objects of a kind that can be selected by a player.

12. An information processing device comprising:

a processor;

a memory coupled to the processor, wherein the memory comprises first instructions executable by the processor and configured to:

accept, from a player, a selection of a character for participation in a first game and a second game, as well as a selection of a character object;

a display medium that displays the first game and the second game;

wherein the memory further comprises second instructions executable by the processor and configured to:

run the first game while allowing a group of characters including the character selected by the player, to participate therein;

create, based on a game result of the first game, a subset consisting of some characters included in the group of characters from a universal set consisting of all characters included in the group of characters;

run the second game while using, for the characters included in the subset, a first plurality of character objects of a predetermined kind other than the character object selected by the player, as some character objects; and perform control to display the first game and the second game on the display medium, wherein the first plurality of character objects of the predetermined kind are character objects involving lower load for display on the display medium than a second plurality of character objects of a kind that can be selected by a player.

* * * * *